US011659584B2

(12) United States Patent
Yang et al.

(10) Patent No.: US 11,659,584 B2
(45) Date of Patent: May 23, 2023

(54) CONFIGURATION OF WIRELESS COMMUNICATION SIGNALS BETWEEN DEVICES

(71) Applicant: Google LLC, Mountain View, CA (US)

(72) Inventors: Shawn Yang, Deerfield, IL (US); Fei He, Santa Clara, CA (US); Michael Kincaid, San Marcos, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 17/316,443

(22) Filed: May 10, 2021

(65) Prior Publication Data

US 2022/0353878 A1 Nov. 3, 2022

(30) Foreign Application Priority Data

Apr. 28, 2021 (EP) .................................... 21170896

(51) Int. Cl.
*H04W 72/12* (2009.01)
*H04B 17/309* (2015.01)
*H04W 4/12* (2009.01)
*H04W 24/06* (2009.01)

(52) U.S. Cl.
CPC ...... *H04W 72/1231* (2013.01); *H04B 17/309* (2015.01); *H04W 4/12* (2013.01); *H04W 24/06* (2013.01)

(58) Field of Classification Search
CPC ... H04W 72/1231; H04W 4/12; H04W 24/06; H04B 17/309
See application file for complete search history.

(56) References Cited

U.S. PATENT DOCUMENTS

| 2004/0242258 | A1 | 12/2004 | Kim |
| 2010/0233975 | A1 | 9/2010 | Wu et al. |
| 2010/0290450 | A1 | 11/2010 | Bennei et al. |
| 2012/0275360 | A1 | 11/2012 | Berenberg |
| 2014/0354226 | A1* | 12/2014 | Draaijer ............... G06F 1/1698 320/108 |

(Continued)

OTHER PUBLICATIONS

EPO, Extended European Search Report for European Patent Application No. 21172896.1, dated Nov. 3, 2021, 12 pages.

(Continued)

*Primary Examiner* — Yaotang Wang
(74) *Attorney, Agent, or Firm* — IP Spring

(57) ABSTRACT

Implementations relate to configuration of wireless communication signals between devices. In some implementations, a method includes determining a transmission scenario associated with transmission of wireless signals of a particular wireless communication protocol from a first device to a second device. The transmission scenario specifies one or more transmission characteristics for the signal transmission. A test message is sent wirelessly from the first device to the second device according to the transmission scenario, and a reply message is received from the second device in response to test message. The reply message includes one or more signal quality indicators that indicate a signal quality of the test message. The transmission scenario is selected as a designated scenario based on the signal quality indicators, and data is wirelessly transmitted from the first device to the second device according to the designated scenario.

20 Claims, 6 Drawing Sheets

(56) References Cited

U.S. PATENT DOCUMENTS

| | | | | |
|---|---|---|---|---|
| 2017/0003713 A1* | 1/2017 | Israeli | ................. | G06F 13/4081 |
| 2020/0359445 A1* | 11/2020 | Wu | ...................... | H04B 7/0626 |
| 2020/0364187 A1 | 11/2020 | Tran | | |
| 2021/0232531 A1* | 7/2021 | Patel | ....................... | G06F 3/023 |
| 2022/0061055 A1* | 2/2022 | Freda | ................ | H04W 72/1263 |

OTHER PUBLICATIONS

IPO, First Examination Report for Indian Patent Application No. 202244022713, dated Dec. 16, 2022, 6 pages.

\* cited by examiner

| Client # | Antenna ID | Tune para-meter | TX Power | Circuit path | Bit rate | Response | Select? |
|---|---|---|---|---|---|---|---|
| 1 | 1 | #0 | High | A | High | RSSI-1, LQI-1 | |
| 1 | 1 | #1 | Mid | B | Mid | RSSI-2, LQI-2 | Y |
| 1 | 2 | #2 | Mid | A | Mid | RSSI-3, LQI-3 | |
| 2 | 1 | #2 | High | C | High | RSSI-4, LQI-4 | Y |
| 2 | 2 | #3 | Mid | D | Mid | RSSI-5, LQI-5 | |
| 3 | 2 | #1 | Mid | A | Mid | RSSI-6, LQI-6 | Y |
| 3 | 1 | #2 | Mid | C | Mid | RSSI-7, LQI-7 | |

FIG. 5

CONFIGURATION OF WIRELESS COMMUNICATION SIGNALS BETWEEN DEVICES

CROSS-REFERENCE TO RELATED APPLICATIONS

This application claims priority to European Patent Application No. 21170896.1, entitled "Configuration of Wireless Communication Signals Between Devices," filed Apr. 28, 2021, and incorporated by reference herein in its entirety.

BACKGROUND

The popularity of portable devices has allowed wireless signal transmission to become ubiquitous, enabling a portable device to send and receive information to and from other devices wirelessly. Many devices include the capability to communicate wireless signals via standards such as Wi-Fi®, enabling transmitting and receiving of data to and from networks such as the Internet via routers and other devices. Further, many devices are capable of wireless communication directly with other devices, via local communication standards such as Bluetooth®, ZigBee®, Wi-Fi Direct, etc. Such local communication standards allow wireless transmission of signals between two devices locally without use of larger networks such as the Internet. However, wireless signal transmission may be subject to interference from a variety of sources, including devices, users, and objects in proximity to transmitted signals.

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

Implementations of this application relate to configuration of wireless communication signals between devices. In some implementations, a computer-implemented method includes determining a first transmission scenario associated with transmission of wireless signals of a particular wireless communication protocol from a first device to a second device. The first transmission scenario specifies one or more first transmission characteristics for the transmission of the wireless signals. A first test message is sent wirelessly from the first device to the second device according to the first transmission scenario, and a first reply message is received from the second device in response to the first test message. The first reply message includes one or more first signal quality indicators that indicate a signal quality of the first test message. The first transmission scenario is selected as a designated scenario based on the one or more first signal quality indicators, and data is caused to be wirelessly transmitted from the first device to the second device according to the designated scenario.

Various implementations and examples of the method are described. For example, in some implementations, selecting the first transmission scenario as the designated scenario includes determining that the one or more first signal quality indicators each meet or exceed a corresponding threshold. In some implementations, the method further comprises detecting a change in device status that includes a threshold change in position or motion of at least one of the first device or the second device, and determining the first transmission scenario is in response to detecting the change in the device status. In some implementations, the method further comprises detecting a change in status of a wireless connection between the first device and the second device, the change in status including a reduction in signal quality for the wireless signals received by the second device, and determining the first transmission scenario is in response to detecting the change in status of the wireless connection.

In some implementations, determining the first transmission scenario includes determining at least one first transmission characteristic of the first transmission scenario based on a status of the first device, the status including a peripheral being connected to the first device via a physical connector, and/or use of one or more antennas of the first device by a different wireless communication protocol.

In some implementations, the method further comprises determining a second transmission scenario that specifies one or more second transmission characteristics of which at least one transmission characteristic has a different value from a corresponding at least one transmission characteristic of the first transmission scenario, sending a second test message from the first device to the second device according to the second transmission scenario, and receiving a second reply message from the second device in response to sending the second test message; the second reply message includes one or more second signal quality indicators and selecting the first transmission scenario as the designated scenario includes comparing the first signal quality indicators to the second signal quality indicators. In some of these implementations, determining the first transmission scenario is subsequent to the determining of the second transmission scenario and is in response to at least one of the one or more second signal quality indicators being below a corresponding threshold.

In some implementations, the method further comprises determining a set of transmission scenarios associated with transmission of the wireless signals of the particular wireless communication protocol from the first device to the second device, each of the transmission scenarios specifying at least one different transmission characteristic than the other transmission scenarios in the set, and determining the first transmission scenario includes selecting the first transmission scenario from the set of transmission scenarios. In some implementations, the first transmission scenario is from a first set of transmission scenarios, and the method further comprises determining a second set of transmission scenarios associated with transmission of the wireless signals of the particular protocol from the first device to a third device, wherein each of the second set of transmission scenarios specifies at least one different transmission characteristic than the other transmission scenarios in the second set; selecting a third transmission scenario from the second set of transmission scenarios; sending a third test message from the first device to the third device according to the third transmission scenario; receiving a third reply message from the third device in response to sending the third test message, the third reply message including one or more third signal quality indicators; selecting the third transmission scenario as a second designated scenario based on the one or more third signal quality indicators; and causing second data to be wirelessly transmitted from the first device to the third device according to the second designated scenario.

In some implementations, the first transmission characteristics include a particular antenna of multiple antennas of the first device via which the wireless signals are to be transmitted from the first device to the second device, and causing the data to be wirelessly transmitted according to the designated scenario includes selecting, based on the designated scenario, the particular antenna to transmit the data in the wireless signals from the first device to the second device. In some implementations, the first transmission characteristics include a tuning parameter for an antenna of the first device that transmits the wireless signals from the first device to the second device, and causing the data to be wirelessly transmitted includes selecting, based on the first transmission scenario, a value of the tuning parameter. In some implementations, the first transmission characteristics include a bit rate of data transmission, and causing the data to be wirelessly transmitted includes selecting, based on the designated scenario, a magnitude of the bit rate. In some implementations, the first transmission characteristics include a hardware circuit path over which the wireless signals are to be transmitted from the first device to the second device, and causing the data to be wirelessly transmitted includes selecting, based on the designated scenario, a particular hardware circuit path for the wireless signals from multiple hardware circuit paths of the first device. In some implementations, the first transmission characteristics include a power level of wireless signals to be transmitted from the first device to the second device, and causing the data to be wirelessly transmitted includes selecting, based on the designated scenario, a magnitude of the power level.

In some implementations, the one or more first signal quality indicators include at least one of: a received signal strength indicator (RSSI) that indicates a power level or signal to noise ratio of the first test message received at the second device; or a link quality indicator (LQI) that indicates data throughput rate of the first test message. In some implementations, the particular wireless communication protocol is a Bluetooth wireless communication protocol standard.

In some implementations, a device includes one or more antennas, a memory storing instructions, and at least one processor coupled to the one or more antennas and to the memory. The processor is configured to access the instructions from the memory and perform operations including determining a first transmission scenario associated with transmission of wireless signals of a particular wireless communication protocol from a first device to a second device, the first transmission scenario specifying a first plurality of transmission characteristics for the transmission of the wireless signals; sending a first test message wirelessly from the first device to the second device according to the first transmission scenario using at least one of the one or more antennas; receiving a first reply message from the second device in response to sending the first test message, the first reply message including one or more first signal quality indicators that indicate a signal quality of the first test message; determining a second transmission scenario that specifies a second plurality of transmission characteristics for the transmission of the wireless signals, wherein at least one transmission characteristic is different than a corresponding at least one transmission characteristic of the first transmission scenario; sending a second test message from the first device to the second device according to the second transmission scenario using one or more of the one or more antennas; receiving a second reply message from the second device in response to the second test message, the second reply message including one or more second signal quality indicators that indicate a signal quality of the second test message; selecting one of the first and the second transmission scenarios as a designated scenario based on the one or more first and the one or more second signal quality indicators; and causing data to be wirelessly transmitted from the first device to the second device according to the designated scenario.

Various implementations and examples of the device are described. In some implementations, the operation of determining the second transmission scenario is in response to each of the one or more first signal quality indicators being below a corresponding threshold, and the operation of selecting one of the first and the second transmission scenarios as the designated scenario includes selecting the second transmission scenario as the designated scenario. The first and the second plurality of transmission characteristics can include a particular antenna of a multiple antennas of the first device via which the wireless signals are to be transmitted from the first device to the second device, a tuning parameter for the particular antenna, a bit rate of data provided by the wireless signals, a particular hardware circuit path of multiple hardware circuit paths of the first device over which the wireless signals are to be transmitted prior to being transmitted wirelessly from the first device to the second device, and/or a power level of the wireless signals, etc. In some implementations, a computer-implemented method, or software instructions stored on a non-transitory computer readable medium, can perform the operations described for the device.

In some implementations, a non-transitory computer readable medium has stored thereon software instructions that, when executed by a processor, cause the processor to perform operations. The operations include determining a set of transmission scenarios associated with transmission of wireless signals of a particular wireless communication protocol from a first device to a second device, each of the transmission scenarios in the set specifying one or more transmission characteristics that include at least one different transmission characteristic than the other transmission scenarios in the set; selecting a first transmission scenario of the set of transmission scenarios; sending a first test message wirelessly from the first device to the second device according to the first transmission scenario; receiving a first reply message from the second device in response to the first test message, the first reply message including one or more first signal quality indicators that indicate a signal quality of the first test message; selecting the first transmission scenario as a designated transmission scenario based on the one or more first signal quality indicators; and causing data to be wirelessly transmitted from the first device to the second device according to the designated transmission scenario.

In various implementations of the computer readable medium, the set of transmission scenarios is a first set of transmission scenarios, and the operations further include determining a second transmission scenario of the set of transmission scenarios, the second transmission scenario specifying one or more transmission characteristics of which at least one transmission characteristic is different from a corresponding at least one transmission characteristic of the first transmission scenario. The operations can further include sending a second test message from the first device to the second device according to the second transmission scenario, and receiving a second reply message from the second device in response to sending the second test message, the second reply message including one or more second signal quality indicators. Selecting the first transmission scenario as a designated transmission scenario can include comparing the first signal quality indicators to the second signal quality indicators.

BRIEF DESCRIPTION OF THE DRAWINGS

FIG. 5 is a diagrammatic illustration of an example list of transmission scenarios to configure wireless communication between devices, according to some implementations;

DETAILED DESCRIPTION

Figure 1:
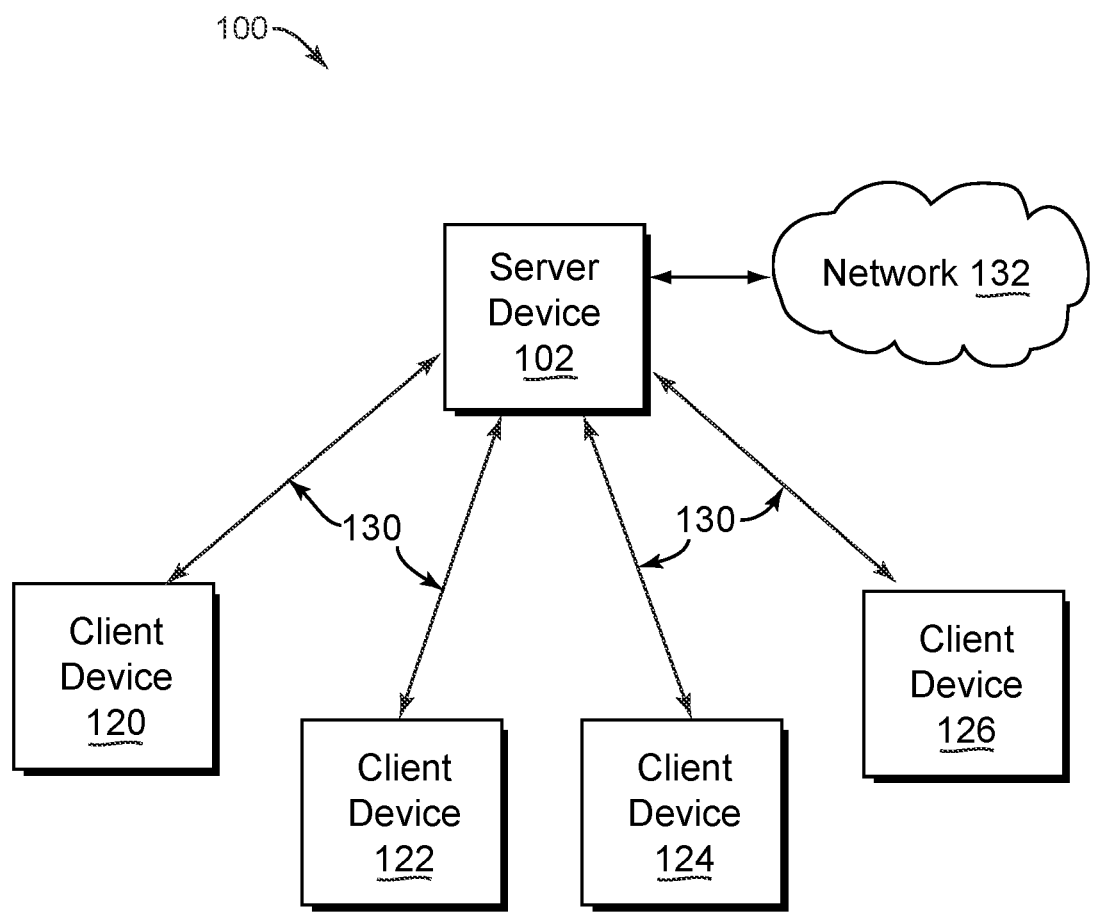
FIG. 1 is a block diagram of an example network environment which may be used for one or more implementations described herein.

One or more implementations described herein relate to configuration of wireless communication between devices. In various implementations, a first device (e.g., a server) communicates with a second device (e.g., a client device) using a particular wireless communication protocol. If a change in status of a device or the wireless connection is detected, one or more transmission scenarios associated with the particular protocol are determined. A transmission scenario specifies transmission characteristics for transmitting wireless signals. A test message is sent from the server to the client device according to one of the transmission scenarios. A reply message from the client device is received, the reply message including one or more signal quality indicators that indicate a signal quality of the test message received by the client device. Based on the signal quality indicators, a transmission scenario is designated to be used, and data is wirelessly transmitted from the server to the client device according to the designated scenario.

Various additional features are described. For example, a set of transmission scenarios can be determined for each client device that is wirelessly connected to a server device and using the particular protocol, in response to the change in status of a device or wireless connection. A designated scenario can be determined for each such client device. Examples of the change in status of the device or wireless connection can include a reduction in signal quality received at the client device, and a change in position, angle, or motion of the server or client device in space. Transmission characteristics configured by a transmission scenario can include a particular antenna of multiple antennas of the server device, a tuner parameter for the particular antenna, a bit rate of data provided by wireless signals, a particular hardware circuit path of multiple such paths for the wireless signals, a power level of the wireless signals, etc.

In some implementations, a transmission scenario can be determined (e.g., selected, generated, or modified) based on a reply message to a previously-tested scenario, and/or based on device statuses or conditions such as peripherals physically connected to the server or client device, tuned status of antennas, and/or current use of antennas of the server or client device by other wireless protocols (e.g., potentially interfering with wireless signals). In some implementations, a transmission scenario can be selected as the designated scenario for transmitting signals if the test message from the scenario is associated with one or more signal quality indicators that each meet or exceed a corresponding threshold. In some implementations, multiple transmission scenarios can be tested for a client device, and the signal quality indicators resulting from these scenarios are compared. The scenario that causes the highest signal quality indicator (e.g., indicating the most reliable or highest quality wireless signal) can be determined as the designated scenario. A rank order of the scenarios may be determined and stored.

One or more features described herein enable wireless communication between devices to have increased signal quality and reliability and decreased signal interference. Disclosed features can detect an actual or prospective reduction in wireless signal quality, e.g., from a detuned transmitting antenna, interference in transmitted signals, etc., and can adjust wireless signal characteristics to compensate for such reduction. For example, transmission scenarios can test whether particular characteristics of a transmitted signal are adequate to provide at least a threshold level of signal quality and reliability, and can change those characteristics based on the results of the test (and other obtained device conditions) that reflect current conditions of server and client device. In some implementations, multiple transmission scenarios can be tested and the best scenario can be selected for use, e.g., based on current conditions of server and client device. Some implementations can detect and compensate for various conditions including hardware transmission path (e.g., RF circuit path and antenna) of a device and blocked or interfering transmission conditions (e.g., position, angle, or motion of server or client device with respect to each other and interfering objects).

The described features can enable more reliable local wireless communication between server and client devices using a particular wireless protocol, such as any of the Bluetooth protocols or Zigbee. The wireless radio of mobile devices is widely used in ambient computing, and wireless link quality has a large impact on user experience, especially for such device tasks as content data streaming (e.g., audio or video data), wireless local broadcasting of data, etc. Features described herein improve wireless signal quality and reliability without any additional changes costs to existing hardware in mobile devices. Furthermore, described features can provide a customized transmission configuration for each different client device that is wirelessly connected to a server. Described features can dynamically select the best transmission scenario for a given set of device conditions based on tested and proven results instead of estimation. In some implementations, the tested conditions include the status of the wireless communication channel (wireless link) between the communicating devices, and not just conditions of a transmitting device. For example, described features allow selection of a transmission scenario providing the highest signal quality in a situation in which a first antenna of a device is not detuned but is blocked by a whole body of a user or other object, and a second antenna of the device is detuned slightly but has line of sight link to the client device. The second antenna may provide a higher quality signal in this situation and may be selected using described features despite its detuned condition.

Consequently, a technical effect of one or more described implementations is that devices expend fewer computational resources to obtain results (efficient wireless transmission). For example, a technical effect of described techniques and features is a reduction in the consumption of system processing and communication resources (such as antenna or other network component utilization) and battery power to transmit data between devices as compared to prior systems that do not provide one or more of the described techniques or features. For example, such a prior system may require frequent re-transmitting of data that was not completely or reliably received by another device, which expends system resources. In another example, such a prior system may only change transmission characteristics in a random or haphazard fashion, causing wasteful use of system resources. Features described herein can reduce such disadvantages by, e.g., enabling selection of customized transmission scenarios that configure the transmission of wireless signals and have been tested for actual device conditions.

Further to the descriptions herein, a user may be provided with controls allowing the user to make an election as to both if and when systems, programs, or features described herein may enable collection of user information (e.g., information about a user's social network, social actions, or activities, profession, a user's preferences, or a user's current location), and if the user is sent content or communications from a server. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over what information is collected about the user, how that information is used, and what information is provided to the user.

FIG. 1 illustrates a block diagram of an example network environment 100, which may be used in some implementations described herein. In some implementations, network environment 100 includes one or more server devices, e.g., server 102 in the example of FIG. 1. Server 102 can communicate over network connections 130, for example. Network environment 100 also includes one or more client devices, e.g., client devices 120, 122, 124, and 126, which may communicate with server 102 and/or with other client devices via network connections 130.

In described implementations, network connections 130 can be implemented as wireless communication network links. In some implementations, network connections 130 can implement a wireless communication protocol that provides local and direct wireless communication of signals between devices, e.g., without using the Internet or other wide area network (WAN)/local area network (LAN) to communicate the signals between devices. For example, network connections 130 can be Bluetooth wireless network connections or related Bluetooth network connections (e.g., Bluetooth Low Energy), implemented using standard Bluetooth network communication components in the server 102 and client devices 120-126. In some implementations, other wireless communication protocols can be used, such as Zigbee, Wi-Fi Direct, etc. In some of these protocols, between two communicating devices, one device functions as a server and the other device functions as a client device. In some implementations, network connections 130 can include communication between client devices 120-126, e.g., using peer-to-peer wireless protocols or having one client device act as a server to the other client device.

In some implementations, server device 102 is connected to one or more networks 132, e.g., Wi-Fi, Ethernet, wide area network, or other networks. For example, server 102 can communicate with other server devices or client devices via one or more of the networks 132. It will be understood that such connections may be with devices that are local or are physically distant from server device 102, whereas connections 130 may be local (within a distance that is within wireless communication range using a particular wireless communication protocol) between server device 102 and client device 120.

As an example, FIG. 1 shows one server 102 and four client devices 120, 122, 124, and 126 that communicate with server device 102. Server 102 can represent one or more devices including processing components, network databases, etc. The devices 102 and 120-126 can be provided in different configurations than shown. For example, server 102 can communicate with other server devices and systems via network connections 130 and/or network 132. In some examples, a database and/or other storage devices can be included in server 120 and/or in communication with server 120 via network connections similar to connections 130 or via network 132. In other implementations, network environment 100 may not have all of the components shown and/or may have other elements including other types of elements instead of, or in addition to, those described herein.

In various implementations, client devices 120-126 may interact with server 102 via applications running on respective client devices and/or server 102. For example, respective client devices 120, 122, 124, and 126 may communicate data to and from server 102. In some implementations, server 102 may send various data to all or particular devices of the client devices, such as content data (e.g., audio, images, video, messages, emails, etc.), notifications, commands, etc. Each client device can send appropriate data to the server 102, e.g., acknowledgments, requests for data, notifications, user commands, etc. In some examples, the server and client devices can communicate various forms of data, including text data, audio data, video data, image data, or other types of data.

Server 102 and client devices 120-126 can be any types of devices used in a variety of applications. In some examples, server 102 is a mobile device such as a smartphone or other similar computing device that is portable and carried by a user. The mobile device wirelessly communicates with client devices over network connections 130, the client devices providing various features that can be enabled or supplemented by signals from the server mobile device.

There may be any number of client devices. Each client device can be any type of electronic device, e.g., desktop computer, laptop computer, portable or mobile device, camera, cell phone, smart phone, tablet computer, television, TV set top box or entertainment device, wearable devices (e.g., display glasses or goggles, head-mounted display (HMD), earpiece, earbuds, fitness band, wristwatch, headset, armband, jewelry, etc.), virtual reality (VR) and/or augmented reality (AR) enabled devices, personal digital assistant (PDA), media player, game device, etc. Some client devices may also have a local database or other storage.

For example, a client device can be a smart watch that is worn on a user's wrist or other portion of the user's body, includes a display screen and/or other output components, and communicates with the server 102 that is a smartphone. In some examples, the smart watch receives data from the server over a network connection 130 and the data is displayed as text and/or images on the display of the smart watch, or alerts or notifications are output by the smart watch based on the received data. The smart watch can receive commands from a smartphone to initiate application programs on the smart watch. The smart watch sends sensor data to the smartphone (e.g., heart rate of user, motion data describing motion of the smart watch), calendar or user data updates provided by user input to the smart watch, etc. In some examples, the smart watch can allow a user to send messages to particular or multiple other users or user devices via network connections 130, server 102, and/or network 132 to which server 102 is connected.

In another example, the server 102 is a smartphone and a client device is an earpiece such as a pair of earbuds, each earbud for positioning in (or near) a respective ear of the user during operation. The earpiece receives audio data from the smartphone over a network connection 130 and outputs the audio data as audio output from the earpiece speakers. The earpiece can communicate acknowledgments to the smartphone, as well as send user commands to the server that are associated with events (e.g., battery of earpiece having remaining power below a threshold, malfunctions, etc.) or user actions such as a button or other control on the earpiece device being activated by the user, receiving a user voice command, etc.

In some implementations, a "user" can include one or more programs or virtual entities, as well as persons that interface with the system or network.

In another example, a first client device communicates with server 102 and also itself operates as a server for a second client device that communicates with the first client device as a client. For example, if the server 102 is a mobile phone and the client device 120 is a smart watch, client device 120 can also be a server to another client device, e.g., an earpiece that wirelessly communicates with the client device 120.

Various applications and/or operating systems executing on the server and client devices can enable a variety of functions including display of content data, privacy settings, notifications, browsers, email applications, communication applications, etc. A user interface can be displayed on a client device using an application or other software executing on the client device, software on the server device, and/or a combination of client software and server software executing on server 102, e.g., application software or client software in communication with server 102. The user interface can be displayed by a display device of a client device or server device, e.g., display screen(s), projector, etc. In some implementations, application programs running on a server can communicate with a client device to receive user input at the client device and to output data such as visual data, audio data, etc. at the client device.

Figure 2:
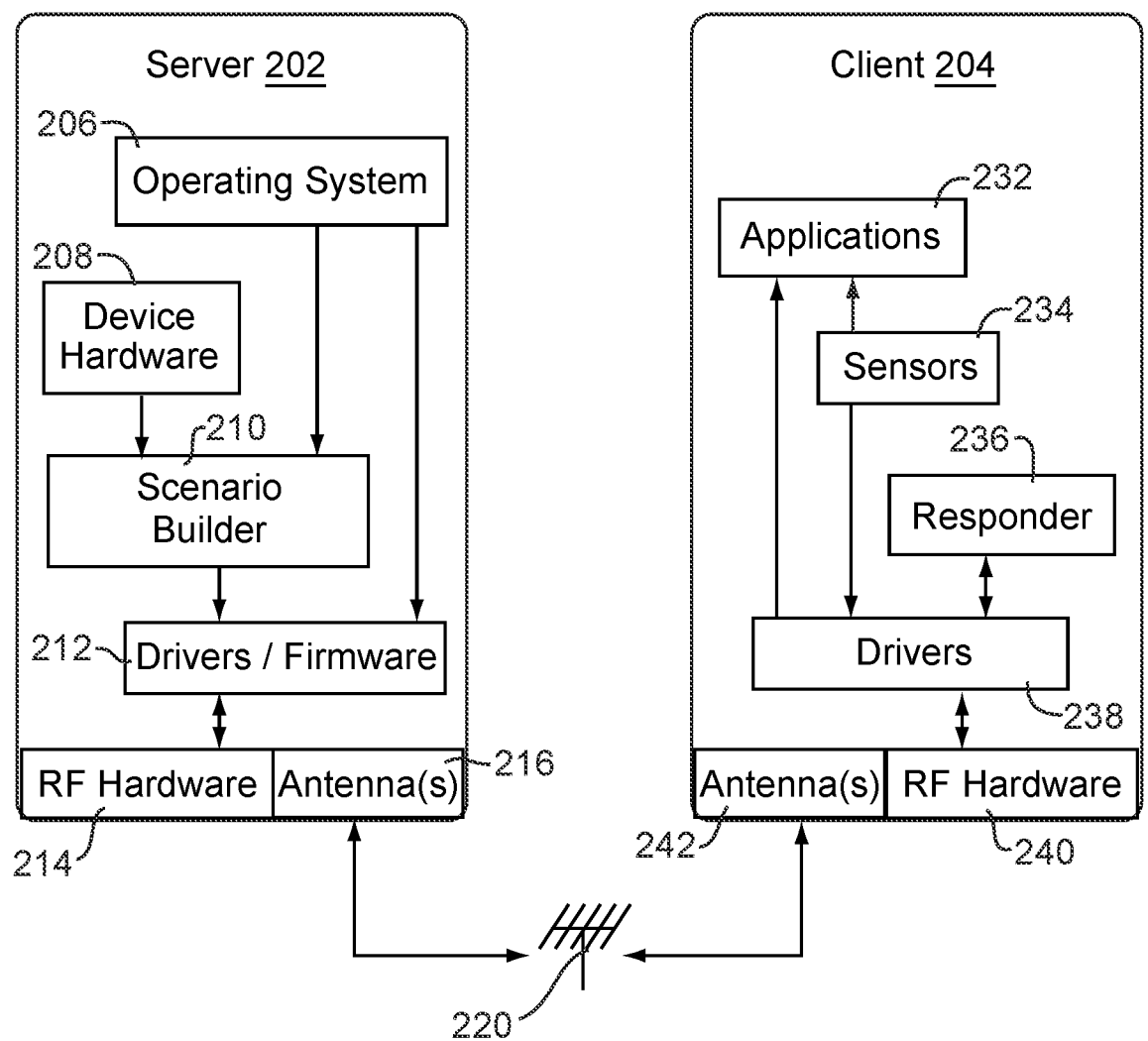
FIG. 2 is a diagrammatic illustration of an example server device and client device that use one more features described herein, according to some implementations.

FIG. 2 is a diagrammatic illustration of a server device and a client device that use one or more wireless configuration features described herein, according to some implementations. Server 202 communicates with client device 204 over a wireless link 220. For example, server 202 can be server 102 and client device 204 can be one of client devices 120-126 shown in FIG. 1.

Server 202 can be any suitable device, examples of which are described above. In some examples, server 202 can be a mobile device such as a smartphone. For example, server 202 can be a mobile device including components such as one or more touchscreens, audio speakers, cameras, cellular telephone, various sensors (GPS, accelerometer(s), gyroscope(s), etc.), etc. Server 202 includes an operating system 206, device hardware 208, a scenario builder 210, drivers/firmware 212, RF hardware 214, and antennas 216. The hardware components of server 202 may be coupled by a communication bus or other hardware (not shown) that enables exchange of information between the components.

Operating system 206 can be implemented on a hardware processor and memory of server 202 (e.g., some examples of which are described below with reference to FIG. 6). Operating system 206 can access hardware components of server 202 and control a variety of functions of the server 202. For example, operating system 206 can provide data to output devices and obtain data from input devices of the server 202. Operating system 206 can access drivers/firmware 212 to obtain information related to wireless network protocols currently operating on server 202, e.g., a Bluetooth stack, etc.

Device hardware 208 can include interface hardware that connects to peripherals and other devices that communicate with the operating system 206 or other components of the server 202 via interfaces such as USB ports, headphone jacks, and other physical interfaces. Device hardware 208 can include one or more processors coupled to a memory (e.g., see FIG. 6). The device hardware can provide connection status and data from connected peripherals such as earpieces, microphones, storage devices (e.g., memory stick), a display screen or monitor, a charging source for batteries of server 202, etc. These peripherals may affect wireless signal communication, and device interface hardware 208 can provide information to server 202 about the connection status of the peripherals. For example, connection status can include whether a peripheral is connected, and whether the peripheral is communicating with the server 202.

Device hardware 208 can include one or more sensors of server 202, such as motion sensors (e.g., accelerometers, gyroscopes, etc.) that detect position, angle, and/or motion of server 202, cameras that capture physical images of the environment around server 202, Global Positioning System (GPS) that detects area or map location of server 202, user presence sensors that detect contact or grasp by the user on the server 202 (e.g., optical, capacitive, or resistance sensors), IR sensors, etc. The operation of various sensors is controlled by the operating system and is in accordance with user-specified configuration settings, e.g., whether a particular sensor is enabled, whether readings from a particular sensor are available to one or more applications that execute on server 202, the resolution of such readings, etc. The user is provided with controls to enable/disable the sensors, and/or to deny permission for use of certain data obtained from the sensors to one or more applications, in certain contexts (e.g., while at locations such as home or work, while driving, when the device is in a particular state, etc.). Device hardware 208 can provide sensor data indicative of the characteristics sensed by these sensors, in accordance with the user-specified configuration settings.

Scenario builder 210 can be implemented as part of software such as operating system 206 or drivers/firmware 212, as a separate application, or in hardware. Scenario builder 210 receives information from device interface hardware 208 that includes indications of the peripherals connected to server 202 and the connection status (and any other statuses) of these peripherals, sensor data (or information derived from sensor data) from sensors of the server 202, and/or other hardware information of server 202. Scenario builder 210 also receives information from operating system 206, including information on current wireless network protocols currently being used for wireless communication by server 202.

Based on the received information, scenario builder 210 determines transmission scenarios for configuring wireless communication signals using a particular wireless network protocol ("particular protocol") (e.g., Bluetooth or other local networking protocol). For example, scenario building 210 can retrieve or generate an initial transmission scenario that specifies particular transmission characteristics for transmitted wireless signals of the particular protocol. In some implementations, one or more transmission scenarios can be retrieved from storage of the server 202, e.g., accessible memory or other storage device. Scenario builder 210 can also modify the characteristics of a particular transmission scenario based on information that the scenario builder 210 obtains from other components such as operating system 206, device hardware 208, and drivers/firmware (e.g., originating from client device 204). Some examples of transmission scenarios are described below with reference to FIG. 3.

Drivers and firmware 212 can implement a variety of communication and other functions of the server 202, including networking protocols. Drivers 212 may comprise software code that is executed by device hardware 208 (e.g., a processor) to access and control RF hardware 214 and/or antennas 216. For example, drivers/firmware 212 output information to RF hardware 214, such that the output information to be transmitted wirelessly to client device 204 and/or other devices. Drivers/firmware 212 determine the output information based on input information received from operating system 206 and scenario builder 210. Similarly, drivers/firmware 212 receive information from RF hardware 214, the information having been wirelessly received from client device 204 and/or one or more other devices. Drivers/firmware 212 can convert the received information to relevant formats and provide the information to operating system 206. In some implementations, drivers 212 can also similarly provide received information to scenario builder 208 and/or various application programs.

Radio frequency (RF) hardware 214 includes hardware used to convert information from drivers and firmware 212 to a form that can be wirelessly transmitted to other devices via one or more antennas 216, and/or to convert incoming wireless signals from antennas 216 to information useable by the other components of server 202. For example, RF hardware 214 can include an RF front end (e.g., amplifiers, filters, mixers, demodulators, oscillators, diplexers, digital-to-analog and analog-to-digital converters, transceiver circuitry, etc.), including at least one signal circuit path connected to the antennas 242. In some implementations, multiple signal circuit paths are provided to the antennas, and one of the signal circuit paths can be selected (e.g., as a transmission characteristic as described below) to transmit a signal from the server to one or more of the antennas 216 for wireless transmission. Different signal circuit paths can have different characteristics affecting signal transmission, e.g., can have various conductive lengths, resistances, capacitances, inductances, etc., and/or can be positioned at different distances to other components that may provide signal interference. Thus, transmission characteristics can change depending on which signal circuit path is used to transmit a wireless signal from server 202.

Antennas 216 can include one or more antennas that are used to transmit and receive wireless signals in communication with other devices. In some implementations, a single antenna 216 is used to transmit and receive information according to multiple different wireless protocols (e.g., Bluetooth, Wi-Fi, etc.). In some implementations, multiple antennas 216 can be available to transmit signals, e.g., one antenna used for one protocol, another antenna used for a different protocol, etc.; or the multiple antennas can be used shared for multiple protocols (e.g., simultaneously or alternating use). Antennas 216 are connected to RF hardware 214 that converts analog signals to digital signals and vice-versa, and performs other needed signal processing.

Wireless signals are transmitted over link 220 using the air as a communication channel by antennas 216, and wireless signals are similarly received by antennas 216. Transmitted wireless signals can be sent to and received by client device 204 and/or other devices.

Client device 204 can be any of the example client devices described above with reference to FIG. 1. Client device 204 includes one or more applications 232, one or more sensors 234, a responder 236, drivers 238, RF hardware 240, and antennas 242. The hardware components of client device 204 may be coupled by a communication bus or other hardware (not shown) that enables exchange of information between the components. Client device 204 includes one or more applications 232 that are software executed on hardware of client device 204, e.g., one or more hardware processors and memory as described below in examples with reference to FIG. 6. Applications 232 can control one or more functions for client device 204, including outputting audio via speakers, outputting images or video via a video screen, processing input provided by a user (e.g., via a touchscreen or other input controls of the client device), etc. In some cases, applications 232 include an operating system similar to operating system 206 of server 202. Applications 232 can receive information from drivers 238 that has been received over a wireless communication channel, including content data (audio, video, etc.), commands, requests, and messages from server 202.

Sensors 234 of the client device can include various sensors that sense a state of the client device and/or the environment surrounding the client device. For example, sensors 234 can include motion sensors, such as one or more accelerometers and/or one or more gyroscopes that sense the motion and orientation of the client device in space. Sensors 234 can include one or more microphones to sense sound in the environment of the client device. Sensors 234 can include one or more cameras, IR sensors to sense infrared light, optical sensors, capacitive sensors, and/or resistive/pressure sensors to sense whether and where a user is contacting or holding the client device, etc. Sensors 234 can include one or more other sensors as included on server 202. The operation of various sensors is controlled by the operating system and is in accordance with user-specified configuration settings, e.g., whether a particular sensor is enabled, whether readings from a particular sensor are available to one or more applications that execute on client device 204, the resolution of such readings, etc. The user is provided with controls to enable/disable the sensors, and/or to deny permission for use of certain data obtained from the sensors to one or more applications, in certain contexts (e.g., while at locations such as home or work, while driving, when the device is in a particular state, etc.). Sensors 234 can send sensor data indicative of the characteristics sensed by these sensors to drivers 238 and/or to applications 232, in accordance with the user-specified configuration settings.

Responder 236 can be software (e.g., an application program or part of an operating system) executing on client device 204 (e.g., a processor) to check for and receive information in a server test message from server 202 and to respond with a reply message to the server 202 that indicates a signal quality of the server test message. As described below, responder 236 receives the test message and determines signal quality indicators, such as received signal strength indicator (RSSI) and/or link quality indicator (LQI), based on characteristics of the test message such as power level and data throughput rates. Responder 236 sends a reply message back to server 202 via a wireless signal, the reply message including one or more of the signal quality indicators. The reply message can also include other status/device information of client device 204 and sensor data from sensors 234. For example, responder 236 sends the reply messages to drivers 238 of client device 204. Responder 236 can also periodically send signal quality indicators and client device status to server 202.

Drivers 238 can implement a variety of communication and other functions of the client device 204, including networking protocols, similarly to drivers 212 of server 202. Drivers 238 may comprise software code that is executed by client device hardware (e.g., a processor) to access and control RF hardware 240 and/or antennas 242. For example, drivers 238 receive input information from RF hardware 240, the input information having been wirelessly received from one or more other devices such as server 202. Drivers 238 can convert the received information to relevant formats and provide the information to applications 232 and/or responder 236. Drivers 238 also can determine output information based on information received from applications 232, sensors 234, and/or responder 236 and send the output information to RF hardware 240, which causes the output information to be transmitted wirelessly to other devices such as server 202.

Radio frequency (RF) hardware 240 includes hardware used to convert information from drivers 238 to a form that can be wirelessly transmitted to other devices via one or more antennas 242, and/or to convert incoming wireless signals from antenna 242 to information useable by the other components of the server. For example, RF hardware can include an RF front end similarly as described above, including one or more hardware circuit paths connected to the antennas 242.

Antennas 242, similarly to antennas 216 of server 202, can include one or more different antennas that are used to transmit and receive wireless signals in communication with other devices. In some implementations, a single antenna 242 is used to transmit and receive information according to multiple different wireless protocols (e.g., Bluetooth, Wi-Fi, etc.). In some implementations, multiple antennas 242 can be available to transmit signals, e.g., one antenna used for one protocol, another antenna used for a different protocol, etc.; or the multiple antennas can be shared for multiple protocols (e.g., simultaneously or alternating use). Antennas 242 are connected to RF hardware 240 that converts analog signals to digital signals and vice-versa, and performs other needed signal processing.

Wireless output signals are transmitted over link 220 using the air as a communication channel by antennas 242, and wireless signals are similarly received by antennas 242. Transmitted wireless signals can be sent to and received by server 202 or other devices.

Figure 3:
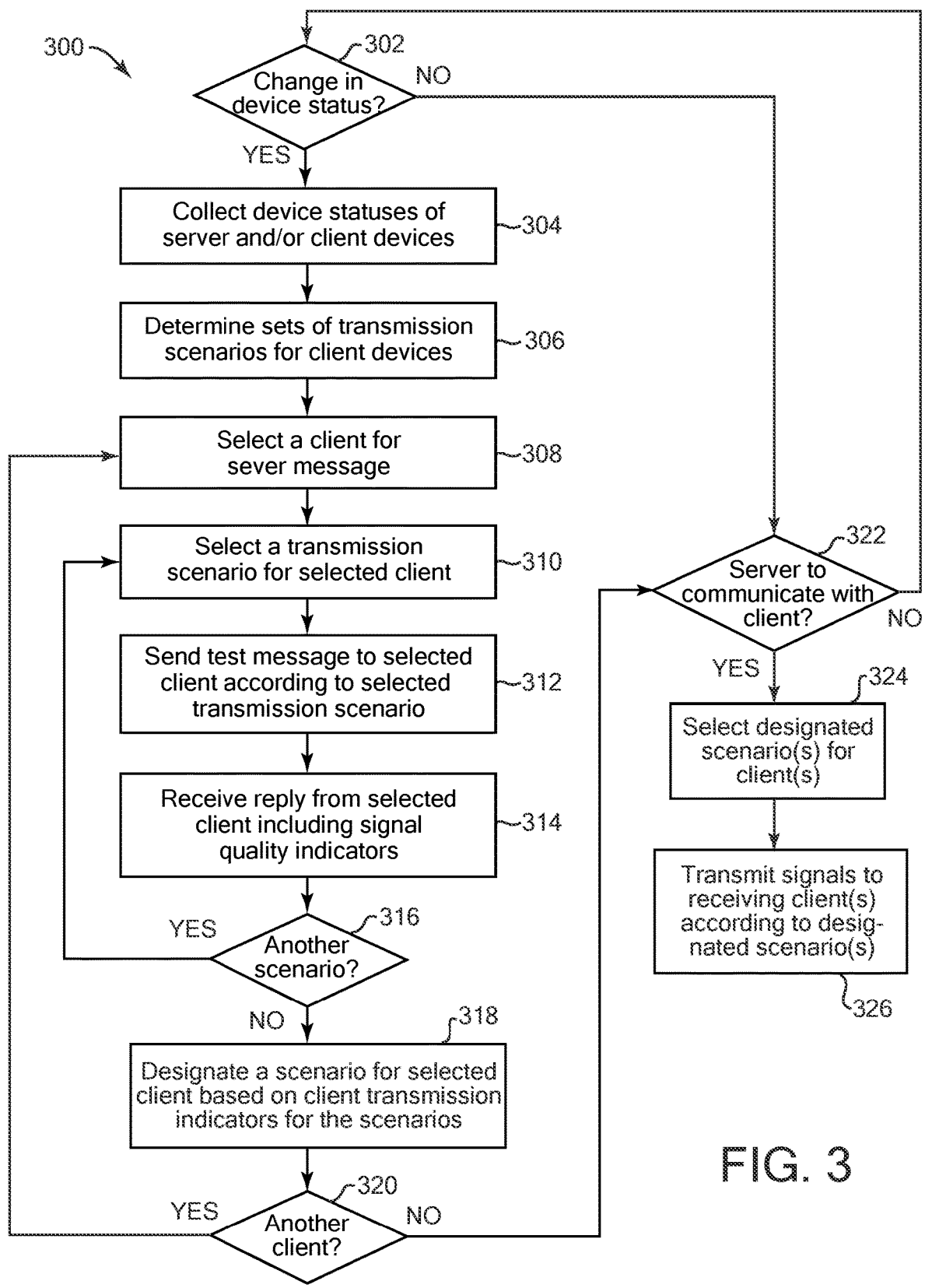
FIG. 3 is a flow diagram illustrating an example method to configure wireless communication between devices, according to some implementations.

FIG. 3 is a flow diagram illustrating an example method 300 to configure wireless communication between devices, according to some implementations. In some implementations, method 300 can be implemented on a server, e.g., server 102 as shown in FIG. 1. In described examples, the system implementing method 300 includes one or more processors or processing circuitry, and one or more storage devices such as a database or other accessible storage. In some implementations, different components of one or more servers can perform different blocks or other parts of the method 300.

For method 300, a server implementing method 300, e.g., server 202 of FIG. 2, has established a wireless network connection with multiple client devices, e.g., client device 204 of FIG. 2 and one or more similar client devices. The wireless network connection is based on a particular protocol that uses wireless signals that are configurable via features described herein. For example, the particular protocol can be a Bluetooth communications protocol, the Zigbee communications protocol, or similar protocols. For such protocols, the server and the client device can communicate wireless signals by transmitting the signals to each other directly, e.g., without having to send signals or information to another device such as a router, hub, or intermediary device, and without having to send data via the internet or other network. In various implementations, the server can have a wireless connection with a single client device, or with multiple client devices. In some implementations, the server can itself also simultaneously be a client device for a different server device.

As used herein, "server" (or "server device") and "client device" are mere designations, and a single device can act as a client for one network connection and as a server for another connection, e.g., at the same time or different times.

In some implementations, the method 300, or portions of the method, can be initiated automatically after a wireless network connection of the particular protocol is established between the server and one or more client devices. Some implementations can initiate method 300 based on user input, e.g., in a displayed user interface of the server. In some implementations, method 300 or portions thereof can be performed with guidance from the user via user input, e.g., user selection or modification of one or more transmission characteristics in a transmission scenario. Method 300 may begin at block 302.

In block 302, it is determined whether a qualifying change in device status is detected. The qualifying change in device status can be any of multiple particular types of changes in state or status of the server, client device(s), and/or network connection (of the particular protocol and/or other protocol being used) between the server and client device. In some implementations, a qualifying change in device status is a reduction in the quality of the network connection between server and client device, e.g., a reduction in wireless signal quality. For example, the server can receive one or more signal quality indicators periodically from the client device over the wireless connection, e.g., a signal including an RSSI indicator that indicates a power level (and/or or signal to noise ratio) of the wireless signals from the server as received by the client device. In some implementations, an LQI indicator can be received that indicates other characteristics such as data throughput rate of a signal. The server can monitor the network connection quality via these received indicators. If the indicator indicates that the network connection quality has dropped sufficiently, e.g., the indicator is below a particular threshold, then a qualifying change in device status can be considered to have occurred.

In some implementations, a qualifying change in device status is a particular change in the position or motion of the server in space and/or a particular change in the position or motion of the client device in space. The particular change in device position may be indicative of a change in wireless reception or communication signal quality in the connection between server and client device. In some examples, the particular change in position or motion can be a threshold (or greater) amount of distance that a device has moved through space, and/or a threshold (or greater) amount of rotation of the device in space. For example, if the server is a mobile phone that is moved from a user's hand to the user's pocket, its position has changed by a distance over, e.g., a threshold distance of one foot (or other threshold distance can be used, e.g., half a meter, 2 feet, etc.). Similarly, if the client device is a smart watch that has moved in space due to the user moving the user's wrist that holds the smart watch, this movement may qualify as the qualifying change in device status if the movement is over a threshold distance.

In some implementations, a change in device angle based on rotation or tilt of the server or client device of more than a threshold rotation angle can be a qualifying change in device status, due to relative positioning of the antennas of the devices that can affect wireless signal quality. In some implementations, a particular device motion, such as a velocity of the server or client device moving in space that is over a threshold velocity, can be a qualifying change in device status. In some implementations, the server and/or the client device may not include a motion sensor or other sensor that can detect change in device position, angle, or motion, in which case such changes are not used to determine a qualifying change in device status.

If no qualifying change in device status is detected in block 302, then the method continues to block 322, described below, to determine if the server is to communicate with one or more of the client devices. If a qualifying change in device status is detected, then the method continues to block 304.

In block 304, device operation statuses of the server and/or the client devices are collected. For example, this status can include device physical connection status, based on peripherals or components are currently connected to physical connectors of the server. These components can include USB devices or other devices connected to USB ports or other ports of the server, devices connected to a headphone jack of the server, and/or other devices physically connected to connectors or ports of the server. In some cases, one or more of these devices may affect wireless transmission, e.g., if a physical connector is located near to an antenna of the server, the connected peripheral or its connecting wire may detune the antenna or otherwise interfere with transmission or reception. An earpiece device connected to a headphone jack may cause similar interference. In some implementations, the physical connection status of one or more connected client device(s) may also be collected and included in the device physical connection status collected in block 304. For example, an earpiece connected to a smart watch client device are identified, etc. In some implementations, the collected physical connection status includes a charging status of the server and/or the client device, e.g., whether the server is charging its batteries by a physical wire connection (or magnetic field connection, e.g., resonance or inductive charging) to a power source such as an electrical wall outlet or other source.

In some implementations, the collected device operation status can include a measure of the tuned status of the antennas of the server and/or the client device. For example, a voltage standing wave ratio (VSWR) can be used to determine a tuned status of an antenna, and to indicate whether and to what extent an antenna is detuned in current transmitting conditions.

In some implementations, the collected device operation status can include device spatial status. Spatial status can be obtained based on sensors of the device. For example, motion sensors such as accelerometers and/or gyroscopes of the server can determine a current position, current motion, and/or current orientation (e.g., tilt) of the server in space. One or more cameras of the server can be used to capture image data of the environment surrounding the server, e.g., whether the device is in a user's pocket (if dark), a user's hand is holding the device, etc. If the client device has sensors, spatial status of one or more connected client device(s) can also be collected, e.g., the server can receive client device spatial status information from the client devices in block 302 or 304, e.g., similarly as described for the client device physical connection status.

In some implementations, the device operation status can include wireless communication status that is collected in block 304. The wireless communication status can indicate whether particular wireless network communication is currently being performed by the device. For example, the wireless communication status of the server can include whether the server is currently communicating with any other devices using a different wireless communication protocol and which antenna(s) of the server that such communication is using. For example, the different wireless communication protocol can be Wi-Fi, or a cellular radio and cellular protocol, e.g., a voice call or data cellular service. The wireless communication status can include whether the different wireless communication protocol is using a transmission frequency that is within a threshold range of frequencies used by the particular protocol to transmit the wireless signals.

In some implementations, the wireless communication status can include whether the server is currently communicating with other devices as a mobile "hotspot," e.g., enabling wireless Wi-Fi connections to other devices by functioning as a Wi-Fi hotspot to communicate data to those other devices from a different device (such as a cellular data source) and/or data from those other devices to other devices connected via Wi-Fi.

The wireless communication status can also include a current communication mode of a device, such as a transmit (TX) mode, a receive (RX) mode, or a transceiver (TX and RX) mode (e.g., simplex, full duplex, or half duplex modes) that use one or more communication channels and/or antennas depending on the mode used. In some implementations, for example, the communication mode is a current operating mode of a cellular radio of the server that uses particular frequency bands for communicating signals; those frequency bands may be close to the frequency bands used by the particular protocol.

In some implementations, client device operation statuses can be determined by the server by receiving information from each client device, e.g., in block 302 or block 304. For example, such information can indicate which peripherals are connected to a client device, the tuned status of the antennas of the client device, wireless communication status of the client device, etc. In further examples, a client device can send such information describing current connection status to the server upon a server request that can be sent in block 304. The method continues to block 306.

In block 306, sets of transmission scenarios are determined for the client devices. For example, a respective set of multiple transmission scenarios can be determined for each client device that currently has a wireless network connection (based on the particular protocol) with the server. A transmission scenario can be used to configure wireless communication between the server and a client device.

A transmission scenario specifies one or more transmission characteristics for wireless signals and/or for the transmission of those signals to an associated client device based on the particular protocol. The transmission of wireless signals is to be configured according to these specified characteristics. In some implementations, the transmission characteristics can include a particular antenna (or multiple such antennas) of the antennas of the server via which wireless signals are to be transmitted from the server to the associated client device. Transmission characteristics can include a value of a tuning parameter for the particular antenna, the tuning parameter used to configure a tuner to tune a calibration or setting of the antenna and to mitigate a detuned condition of the antenna (e.g., by setting or changing an impedance of a tuner included in a circuit path of the antenna). Transmission characteristics can include a specified bit rate (or modulation rate) of data or packets transmitted in the wireless signals from the server. Transmission characteristics can include a particular transmission circuit path of a plurality of such paths of the server via which wireless signals are to be transmitted to the antenna. Transmission characteristics can include a magnitude or level of transmission power of the wireless signals transmitted from the server. Other transmission characteristics can be specified in a variety of implementations. In some implementations, transmission characteristics that are not specified in a transmission scenario can be set to default values and settings.

In some implementations, a transmission scenario can specify one or more characteristics of a different wireless signal (e.g., that is using a different network protocol) that are to be configured. For example, the different wireless signal may be interfering with the wireless signals of the particular protocol. In some examples, if a cellular radio is operating and may be interfering with the wireless signals of the particular protocol, the transmission scenario can include a transmission characteristic that is a lower transmit power for the cellular radio signal. When that scenario is implemented to configure the wireless signal of the particular protocol, it also configures the cellular radio wireless signal accordingly.

In some implementations, a respective set of multiple transmission scenarios is determined for each client device, and each transmission scenario has at least one different transmission characteristic from each other scenario in the same set.

In some implementations, the set of multiple transmission scenarios are at least partially determined by retrieving one or more pre-configured or predetermined transmission scenarios from storage, e.g., from local storage on the server or remote storage on a different device over a network connection. The predetermined transmission scenarios can specify transmission characteristics that provide reliable wireless signals in a wide variety of transmission conditions. Each scenario in the set has one or more transmission characteristics different from each other.

In some implementations, one or more of the multiple transmission scenarios in a set, and/or one or more of the transmission characteristics in the scenarios, can be initially selected, generated, or modified based on one or more collected device characteristics, e.g., based on received or collected device information (such as device statuses collected or received in blocks 302 and/or 304). For example, if the detected change in device status of block 302 includes an RSSI indicator that indicates a particular low level of transmission signal power received by the client device, then a particular stored scenario that includes a particular tune parameter value can be selected or modified as an initial transmission scenario, if the particular tune parameter is known to compensate for a low power signal in many situations. If a particular detected device position or motion indicates that the user is holding the client device at a position and/or angle that blocks the wireless transmission path of a first antenna of the server, then a transmission scenario can be determined that configures a second antenna of the server to be used for transmitting wireless signals. If a peripheral is physically connected to a connector of the server that is located close to a first antenna of the server, then a scenario that designates a second antenna located further from that connector can be determined for use (e.g., select a scenario that configures the second antenna for use, or the antenna characteristic can be modified to the second antenna in a selected scenario). In some implementations, one or more transmission characteristics can be initially set to values based on device or signal status; e.g., a tuning parameter can be assigned an initial value based on a detuned condition of a server antenna as detected by the server.

In some implementations, one or more transmission characteristics can be excluded from adjustment in determined transmission scenarios. For example, if other signals of a different wireless protocol (e.g., Wi-Fi) are current being communicated by the server using only a first antenna of multiple available antennas of the server, then the signals of the particular protocol can be transmitted on a different (e.g., second) antenna, and transmission characteristics (e.g., tuning parameter) can be adjusted for this second antenna in transmission scenarios. If, however, other signals of a different wireless protocol are to be sharing a same server antenna as the signals of the particular protocol, then in some implementations the tuning parameter can excluded from adjustment in transmission scenarios, e.g., to avoid changing transmission parameters for the communication of the other signals.

In various implementations, predetermined scenarios with particular transmission characteristics can be retrieved and used, individual transmission characteristics in predetermined scenarios can be modified, or transmission scenarios can be generated to include particular transmission characteristics. In some implementations, an initial transmission scenario can be a predetermined scenario.

In some implementations, a set of multiple transmission scenarios is determined. Each transmission scenario in a set of scenarios can vary one or more of the transmission characteristics. For example, if a first transmission scenario designates a particular tune parameter value, a second scenario in the set can designate a different tune parameter value. In some implementations, multiple transmission characteristics can be varied. For example, a transmission scenario can change a bit rate, circuit path, and/or antenna to be different than another scenario in the set. In some implementations, different combinations of transmission characteristics are provided for each scenario that are known to complement each other and to provide reliable wireless signals in different circumstances (e.g., when one antenna is blocked, when the client device is touched by user or in a pocket of user's clothing, etc.).

In some implementations, a set of transmission scenarios is determined for each client device that currently has a wireless connection of the particular protocol to the server. Each such set of scenarios can have different numbers of scenarios and different transmission characteristics. For example, a set of scenarios for a smart watch client device can be different than a set of scenarios for an earpiece client device.

In some implementations, the transmission scenarios in each determined set are ranked. For example, each ranking can be based on the estimated performance of the scenario in general conditions. In some implementations, the ranking can be based on the estimated performance of the scenario for the current device characteristics of the server and/or the client device associated with the set of scenarios, as based on received device information (e.g., device statuses received or collected in blocks 302 and 304) for the server and/or the client device. For example, a scenario that provides a higher quality signal for a condition in which the user is holding the client device can be ranked higher than a scenario that does not perform as well for that condition. The method continues to block 308.

In block 308, a client device is selected from the client devices connected to the server with a wireless connection using the particular protocol. The method continues to block 310.

In block 310, a transmission scenario for the selected client device is selected for testing from the set of transmissions scenarios associated with the selected client device. In some implementations, a particular transmission scenario is selected as an initial scenario for the selected client device, e.g., a scenario that is known to provide general wireless signal reliability and/or performance above particular threshold measures.

In some implementations, an initial scenario is selected based on the device information describing device characteristics of the server and/or client device, such as device status information, as collected or received in blocks 302 and 304. For example, a low signal power level indicated by an RSSI indicator received from the client device in block 302 can indicate to select an initial scenario having a particular tune parameter value to tune the antenna to compensate for that signal power level; or the server can modify the tune parameter in a selected initial scenario to a desired value that will provide the compensation.

In some implementations, the set of multiple scenarios were generated or selected in block 306 based on such device information, and one of the multiple scenarios is considered to be most likely to provide the most reliable wireless signal (e.g., highest ranked). This highest ranked scenario can be selected as an initial scenario in block 310.

In subsequent iterations of block 310, one or more transmission scenarios have been previously selected and tested, and a different scenario is selected as the next scenario to test (e.g., if the previously-tested scenario did not meet one or more thresholds in some implementations). Such a scenario can be selected as the next listed scenario in a list of the multiple scenarios, e.g., as the scenario having the next rank in an ordered list of scenarios ranked based on likely performance or other criteria. The method continues to block 312.

In block 312, a server test message is wirelessly sent to the selected client device, the test message being based on (e.g., configured by) the transmission characteristics of the selected transmission scenario. For example, the test message includes and is transmitted using characteristics specified in the selected scenario, such as a particular antenna of multiple antennas of the server from which the server message is transmitted, value of a tune parameter for the particular antenna, a specified bit rate, a particular circuit transmission path of the server, a specified power level of the wireless signal, etc. The method continues to block 314.

In block 314, a reply message is received from the selected client, the reply including signal quality indicators for the test message signal received at the client device. The client signal quality indicators can include, for example, an RSSI and/or an LQI. The RSSI indicates a power level or signal to noise ratio of the test message signal received at the client device, and the LQI indicates a received data throughput rate, power level, and/or other characteristics of the test message signal received at the client device. In some implementations, an LQI below a threshold can cause a re-transmit of the test message by the server if the server message was not properly received by the client device. Other indicators relating to characteristics of the test message signal received at the client device can also or alternatively be received by the server from the client device in the reply message. In some implementations, the reply message can include other characteristics of the client device, e.g., physical connection status, sensor data, wireless communication operating modes, etc., similarly as described for blocks 302 and 304. In some implementations, the signal quality indicators are obtained via an operating system executing on the server, where the operating system can access the signal quality indicators from a standard network protocol stack. The method continues to block 316.

In block 316, it is determined whether a test message is to be sent to the selected client device according to another transmission scenario in the set. In some implementations, this determination is based on the reply message received in block 314. For example, if the reply message indicates that the server message sent in block 312 has one or more particular signal characteristics having at least corresponding threshold levels as received by the client device, then the server can omit sending another test message based on another transmission scenario, thus providing a negative result for block 316. The method then continues to block 318. For example, the particular signal characteristics can be signal power level, data throughput rate, and/or other characteristics indicated by the reply message.

If the reply message indicates that the received server message did not have at least the threshold levels of the particular signal characteristics, then another transmission scenario is to be selected, thus indicating a positive result for block 316. In this case, the method continues to block 310 to select another transmission scenario from the set to configure another test message to send to the selected client device. In various implementations, the next transmission scenario to be tested can be selected from the set of transmission scenarios previously-determined (e.g., previously selected or generated) in block 306, or the next transmission scenario can be generated after the positive result of block 316. For example, the next transmission scenario can be generated (or a previously-determined transmission scenario modified) based on the reply message and/or based on device information from blocks 302 and/or 304. For example, if the reply message indicates a low power level and a client device at a particular position in space, an appropriate transmission scenario characteristics are generated to compensate for the power level.

If, in the next iteration, the next test message does not have at least the threshold levels as indicated by a next received reply message, then another scenario is selected, generated, or modified (e.g., based on the next reply message) and tested in another iteration, and so on until all of the scenarios in the set for the selected client device have been tested.

In some implementations, a positive result of block 316 can be determined based on other criteria. For example, the server may send all or multiple server messages to the client device to test multiple scenarios regardless of the characteristics of the received signal as indicated in the reply message. In some of these implementations, block 316 determines if there is another scenario in the set of transmission scenarios that has not yet been tested, and if so, the method continues to block 310 to select another transmission scenario to configure another server message. If there are no untested scenarios remaining in the set, then the method continues to block 318. In some of these implementations, the next transmission scenario to be selected in block 310 can be selected based on the reply message, e.g., a scenario having one or more transmission characteristics that provide a more reliable signal than the signal indicated by the reply message. In some implementations, the next scenario to be selected in block 310 can be a modified version of a preconfigured scenario, e.g., modified based on the reply message.

In block 318, a transmission scenario is designated for the selected client based on the signal quality indicators received in the one or more reply messages received in response to sending one or more test messages in block 312. In some implementations or cases, one test message may have been sent to the client and, due to the reply message indicating the test message meets or exceeds one or more thresholds (e.g., a threshold quality indicator, threshold power level, threshold data throughput rate, etc. indicating a reliable wireless signal), no other test messages were sent. In such a case, the single tested scenario is the designated scenario.

In other cases or implementations, multiple test messages have been sent to the client device according to respective associated transmission scenarios (e.g., in multiple iterations of blocks 310 to 314), and one of these transmission scenarios is selected as the designated scenario. In some of these implementations, the signal quality indicators received for the multiple test messages are compared to determine the designated scenario. For example, the scenario that caused the highest quality signal can be the designated scenario. In some examples, the transmission scenario that caused the highest power level and/or other characteristics indicating a more reliable or quality wireless signal can be the designated scenario. In some implementations, only scenarios that caused their associated test message to meet or exceed one or more thresholds are eligible to be the designated scenario (unless there are no such scenarios).

In some implementations, the multiple transmission scenarios used to send test messages are evaluated and one of these scenarios is selected as the designated scenario based on one or more additional criteria. For example, various characteristics can be weighted for each tested transmission scenario. In some examples, a signal power level can be weighted strongly, such that a tested scenario causing a much greater signal power level will be the designated scenario. If signal power level is equal or within a small threshold between two tested scenarios, then other signal or device characteristics can be examined. For example, if a physical device status such as position, angle, or movement was reported in the reply messages (or in other received information), then the scenario that is more appropriate to the current physical device status can be weighted higher, which may cause that scenario to be designated. The method continues to block 320.

In block 320, it is determined whether there is another client device to test for signal reception. Any other client devices that are wirelessly connected to the server, using the particular protocol, can be selected if these client devices are untested by blocks 310-318. If there is another client device to test, the method continues to block 308 to select another client device to test. If there are no more client devices to test, then the method continues to block 322.

In block 322, it is determined whether the server is to communicate with one or more of the client devices using wireless signals according to the particular protocol, e.g., transmit a wireless signal to those client devices. For example, the server may have been instructed by the user to send and/or receive audio or music data, video data, game data, notification data, or other data to one of the client devices, or an application on the server may have been triggered to initiate such communication. If the server is not going to communicate with any client devices using the particular protocol, the method continues to block 302 to determine if a qualifying change in device status has occurred. If the server is going to communicate with one or more client devices using the particular protocol, the method continues to block 324.

In block 324, the designated scenario(s) determined in block 318 are selected for the client devices which with the server is to communicate. For example, if first and second client devices are to be communicated with, the respective designated scenario associated with each of these client devices is selected. The method continues to block 326.

In block 326, the server transmits data via wireless signals to the receiving client device(s) according to (e.g., the signals configured by) the designated scenario(s). The server also receives wireless signals from the client device(s) according to the characteristics of the designated scenario(s) (e.g., antenna, circuit path, etc.). For example, the server selects values of the transmission characteristics of the wireless signals according to the designated scenario(s). In some implementations, each client device also transmits signals to the server as configured by the associated designated transmission scenario, for those transmission characteristics that apply to the client device (e.g., a client device may not have the same options to select one of multiple antennas, circuit paths, etc. as the server).

In some implementations, after block 326, the method can return to block 302 to continue to monitor for further qualifying changes in status of the server and client devices that have a connection with the server using the particular protocol. If no qualifying change is detected, the server continues to communicate with the client device using signals configured by the designated scenario.

In some implementations, server 102 and/or one or more client devices 120-126 can use machine learning, e.g., use a trained machine learning model to determine which transmission scenarios are to be generated and/or selected as described in method 300. In some implementations, the machine learning model may be a neural network with one or more nodes, arranged according to a network architecture, e.g., in one or more layers, with various nodes connected via the network architecture, and with associated weights. For example, in a training stage of the model, a model can be trained using training data (e.g., transmission characteristics and resulting signal quality), and then at an inference stage, the trained model can determine a transmission scenario and/or particular transmission characteristics to select for transmission based on current conditions (as indicated in reply messages, device information, etc.). For example, the machine learning model can be trained using data from test transmissions indicating signal transmission having a signal quality above particular thresholds. In some implementations, the machine learning model can be trained based on sample data, e.g., sample transmission scenarios and sample transmission data. Based on the sample transmissions, the model can determine a transmission scenario and/or transmission characteristics to use in a transmission scenario. In some implementations, a model may be trained offline, e.g., on a test device in a test lab or other setting, and the trained model may be provided to the server that executes method 300. In some implementations, the trained model may be retrained or updated locally on-device, or an untrained model may be trained on-device. In some implementations, with user permission, federated learning may be utilized to update the trained model, e.g., where individual server devices may each perform local model training, and the updates to the models may be aggregated to update one or more central versions of the model.

The methods, blocks, and operations described herein can be performed in a different order than shown or described, and/or performed simultaneously (partially or completely) with other blocks or operations, where appropriate. Some blocks or operations can be performed for one portion of data and later performed again, e.g., for another portion of data. Not all of the described blocks and operations need be performed in various implementations. In some implementations, blocks and operations can be performed multiple times, in a different order, and/or at different times in the methods.

Figure 4:
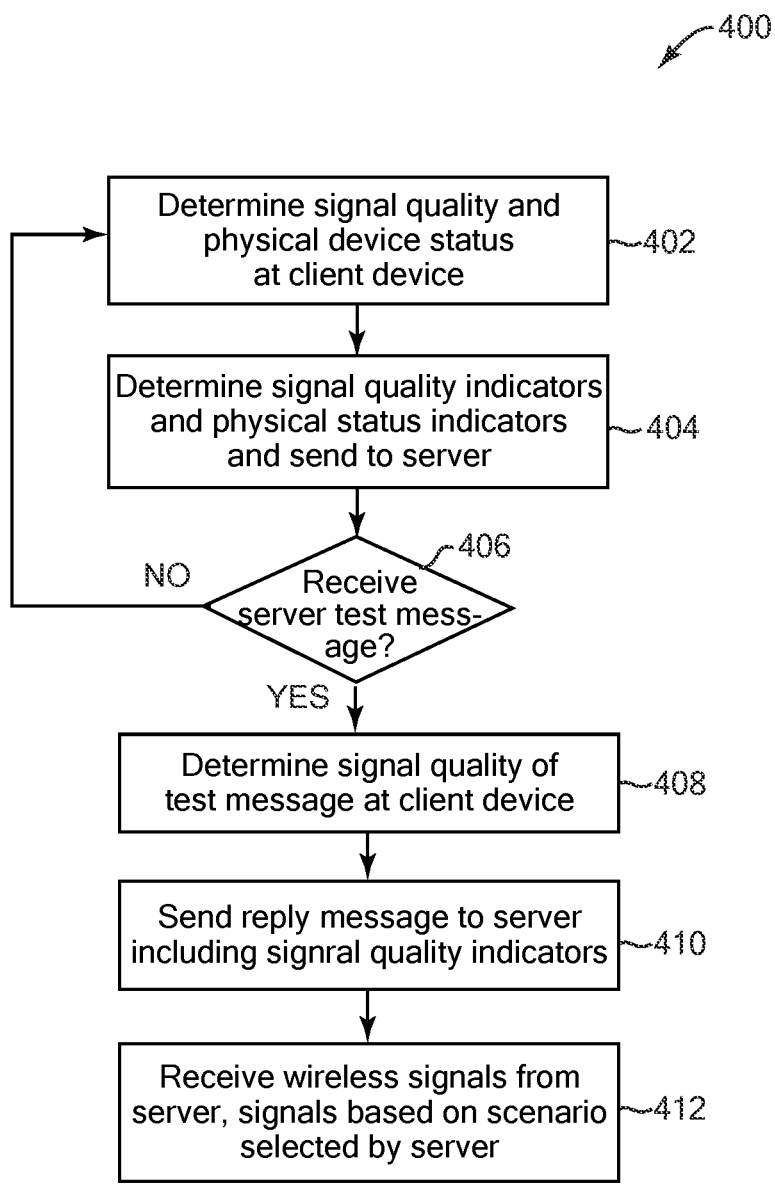
FIG. 4 is a flow diagram illustrating an example method to enable configuration of wireless communication between devices, according to some implementations.

FIG. 4 is a flow diagram illustrating an example method 400 to enable configuration of wireless communication between devices, according to some implementations. In some implementations, method 400 can be implemented on a client device, e.g., one or more client devices 120-126 as shown in FIG. 1. In described examples, the system implementing method 400 includes one or more processors or processing circuitry, and one or more storage devices such as a database or other accessible storage.

In method 400, a client device implementing method 400, e.g., client device 204 of FIG. 2, has established a wireless network connection with a server, e.g., server 202 of FIG. 2. Other client devices may also similarly have a wireless network connection with the server. For example, the wireless network connection can be based on the particular protocol, such as Bluetooth, as described above. In some implementations, the client device can itself also simultaneously be a server for a different client device.

In some example implementations, method 400 is performed on a client device that has a wireless connection, using the particular protocol, with a server that is performing method 300 as described with reference to FIG. 3. Method 400 may begin at block 402.

In block 402, signal quality of wireless signals from the server and physical device status of the client device are determined at the client device. For example, for signal quality, the client device can determine the signal power of a wireless signal from the server. The client device can also or alternatively determine a data throughput rate of data received via wireless signals from the server and or other signal characteristics. Other characteristics of the wireless signal can be determined in various implementations to determine signal quality.

For physical device status, the position, angle, and/or movement of the client device can be determined if the client device includes appropriate sensors as described in examples above. For example, motion sensors such as accelerometers and/or gyroscopes can sense client device motion if the client device includes one or more of these sensors. If the client device includes a camera, captured images can indicate motion or position of the client device. The method continues to block 404.

In block 404, signal quality indicators are determined based on the signal quality of block 404, and the signal quality indicators are sent to the server. For example, the client device can determine RSSI and/or LQI indicators based on signal power, data throughput rate, etc. Other signal indicators can also be determined. In some implementations, signal quality indicators are periodically determined and sent to the server in blocks 402 and 404 while a wireless connection of the particular protocol exists between the client device and the server.

Physical status indicators can be determined based on the physical device status determined in block 404. For example, an indicator can include a value indicating an amount of motion of the client device (e.g., distance moved or angle rotated), and/or a value indicating a current environment of the client device (e.g., a user's hand or ear, or user's pocket). Physical device status indicators can be sent to the server periodically with the signal quality indicators. In some implementations, the physical device status indicators can be sent to the server in response to a threshold change in device physical status. For example, the threshold change can be the client device being moved greater than a threshold distance or rotated more than a threshold angle. In some implementations, the client device can also send physical connection status of the client device to the server in block 404, e.g., indicating which peripheral devices are connected to the client device and the physical connectors or ports of the client device used for the connections. In some implementations, the client device can also send wireless communication status of the client device to the server in block 404, e.g., indicating a current communication mode of the client device such as transmit (TX) mode, receive (RX) mode, or transceiver (TX and RX) mode. The method continues to block 406.

In block 406, it is determined whether the client device has received a test message of the particular protocol from the server that requests signal quality indicators. As described for block 312 of FIG. 3, the server configures a test message based on a selected transmission scenario for the client device, and sends the test message to the client device. If a test message has not been received, the method continues to block 402 to determine signal quality (e.g., periodically) as described above. If a test message has been received, the method continues to block 408.

In block 408, the signal quality of the received test message is determined by the client device. Similarly as in the examples described above, RSSI and/or LQI indicators can be determined for the test message, including determining power level and data throughput rate of the message signal. In some implementations, if the client device includes appropriate sensors, physical device status can also be determined at the time of receiving the server test message, e.g., movement, position, or angle in space of the client device, and/or a current environment of the client device (e.g., held in hand, in ear, or pocket). The method continues to block 410.

In block 410, a reply message is sent to the server that includes signal quality indicators determined in block 408. If physical device status was also determined in block 408, it can also be sent to the server in block 410. The method continues to block 412.

In block 412, wireless signals are received from the server according to the particular protocol. The wireless signals have been transmitted by the server as configured by a selected transmission scenario, as described with respect to FIG. 3. In some implementations, after or during the signal reception of block 412, the method can continue to block 402 to determine signal quality of the wireless signals and send signal quality indicators (and/or physical device status of the client device) to the server (e.g., periodically), as described above.

The methods, blocks, and operations described herein can be performed in a different order than shown or described, and/or performed simultaneously (partially or completely) with other blocks or operations, where appropriate. Some blocks or operations can be performed for one portion of data and later performed again, e.g., for another portion of data. Not all of the described blocks and operations need be performed in various implementations. In some implementations, blocks and operations can be performed multiple times, in a different order, and/or at different times in the methods.

One or more methods disclosed herein can operate in several environments and platforms, e.g., as a stand-alone computer program that can run on any type of computing device, as a mobile application ("app") run on a mobile computing device, etc.

One or more methods described herein can be run in a standalone program that can be run on any type of computing device, a program run on a web browser, a mobile application ("app") run on a mobile computing device (e.g., cell phone, smart phone, tablet computer, wearable device (wristwatch, armband, jewelry, headwear, virtual reality goggles or glasses, augmented reality goggles or glasses, etc.), laptop computer, etc.). In one example, a client/server architecture can be used, e.g., a mobile computing device (as a client device) sends user input data to a server device and receives from the server the final output data for output (e.g., for display). In another example, all computations of a method can be performed within the mobile app (and/or other apps) on the mobile computing device. In another example, computations can be split between the mobile computing device and one or more server devices.

Methods described herein can be implemented by computer program instructions or code, which can be executed on a computer. For example, the code can be implemented by one or more digital processors (e.g., microprocessors or other processing circuitry) and can be stored on a computer program product including a non-transitory computer readable medium (e.g., storage medium), such as a magnetic, optical, electromagnetic, or semiconductor storage medium, including semiconductor or solid state memory, magnetic tape, a removable computer diskette, a random access memory (RAM), a read-only memory (ROM), flash memory, a rigid magnetic disk, an optical disk, a solid-state memory drive, etc. The program instructions can also be contained in, and provided as, an electronic signal, for example in the form of software as a service (SaaS) delivered from a server (e.g., a distributed system and/or a cloud computing system). Alternatively, one or more methods can be implemented in hardware (logic gates, etc.), or in a combination of hardware and software. Example hardware can be programmable processors (e.g. Field-Programmable Gate Array (FPGA), Complex Programmable Logic Device), general purpose processors, graphics processors, Application Specific Integrated Circuits (ASICs), and the like. One or more methods can be performed as part of or component of an application running on the system, or as an application or software running in conjunction with other applications and operating system.

FIG. 5 is a diagrammatic illustration of an example list 500 of transmission scenarios that can be used to configure wireless communication between devices, according to some implementations. Scenarios such as those provided in list 500 can be used in one or more implementations described herein.

In this example, list 500 includes multiple transmission scenarios that have been retrieved or generated by the server for three client devices that have wireless connections with the server according to the particular protocol (e.g., Bluetooth protocol). Each scenario is associated with five transmission characteristics for wireless signals transmitted based on that scenario, and the transmission characteristics can be varied by their values to produce different scenarios.

In this example, these transmission characteristics are antenna ID, tune parameter, transmit (TX) power, circuit path, and bit rate.

Client device 1 is associated with a set of three transmission scenarios 502*a*, 502*b*, and 502*c* in list 500 (collectively referred to as scenarios 502). These transmission scenarios were retrieved and/or generated for sending server test messages to client device 1. For example, scenario 502*a* specifies characteristics including antenna 1 (of 2 available antennas of the server), tune parameter #0, high transmit power, circuit path A, and high speed bit rate. Scenario 502*b* specifies the same antenna characteristic as scenario 502*a* but differs from scenario 502*a* in the other characteristics, including tune parameter #1, middle level transmit power, circuit path B, and middle speed bit rate. Scenario 502*c* specifies a circuit path that is the same as scenario 502*a* and specifies a transmit power and bit rate that are the same as scenario 502*b*, but specifies antenna 2 and tune parameter #2 that are different than scenarios 502*a* and 502*b*. Each scenario, when tested in a test message, receives a reply message that includes the RSSI and LQI signal quality indicators shown in list 500 that are associated with that scenario. In some implementations, these indicators can be stored and compared to the corresponding indicators received for the other scenarios in the set. The scenario that produces the highest signal quality indicators is selected as the designated scenario for client device 1. In this example, scenario 502*b* is found to provide the highest signal quality and is selected as the designated transmission scenario for client device 1.

In some implementations, scenarios can be generated by randomly adjusting values of one or more characteristics in each different scenario in the list, and all of the scenarios in the set are tested and their reply messages compared to determine which scenario generates the highest quality wireless signal. In some implementations, some scenarios can be generated based on, or in response to, a reply message received from the client device for a scenario that was tested. For example, scenario 502*a* can be a default initial scenario that is tested before the generation of scenarios 502*b* and 502*c*. Scenario 502*a* causes a reply message that indicates a lower signal quality (e.g., below a RSSI threshold and/or LQI threshold). For example, the transmitted test message may have too high a power (e.g., the signal may be interfering with a different wireless signal of a different protocol), so the transmit power is lowered to middle level in the next generated scenarios 502*b* and 502*c*. The bit rate is also lowered to middle speed for the next scenarios 502*b* and 502*c*. In scenario 502*c*, a different antenna is used to transmit the signal. The tune parameter is varied for each scenario to test different tuning arrangements for the antenna that is used. After testing scenarios 502*b* and 502*c*, it is determined that scenario 502*b* provides the highest signal quality to client device.

Client device 2 is associated with a set of two transmission scenarios 504*a* and 504*b* in list 500. For example, scenario 504*a* specifies characteristics of antenna 1, tune parameter #2, high transmit power, circuit path C, and high speed bit rate. Scenario 504*b* specifies different transmission characteristics from scenario 504*a*, including tune parameter #3, middle level transmit power, circuit path D, and middle speed bit rate. Each scenario, when tested in a test message, receives a reply message that includes the RSSI and LQI signal quality indicators shown in list 500 that are associated with that scenario. In this example, both scenarios 504*a* and 504*b* are generated and tested, and scenario 504*b* is found to provide the highest signal quality of the two scenarios and is selected as the designated transmission scenario for client device 2.

Client device 3 is associated with a set of two transmission scenarios 506*a* and 506*b* in list 500. For example, scenario 506*a* specifies characteristics of antenna 2, tune parameter #1, middle level transmit power, circuit path A, and middle speed bit rate. Scenario 506*b* has some transmission characteristics that are different from scenario 506*a*, including antenna 1, tune parameter #2, and circuit path C. In this example, both scenarios 506*a* and 506*b* are generated and tested, and scenario 506*a* is found to provide the highest signal quality of the two scenarios and is selected as the designated transmission scenario for client device 3.

In some implementations, some or all of the methods can be implemented on a system such as one or more client devices. In some implementations, one or more methods described herein can be implemented, for example, on a server system, and/or on both a server system and a client system. In some implementations, different components of one or more servers and/or clients can perform different blocks, operations, or other parts of the methods.

Figure 6:
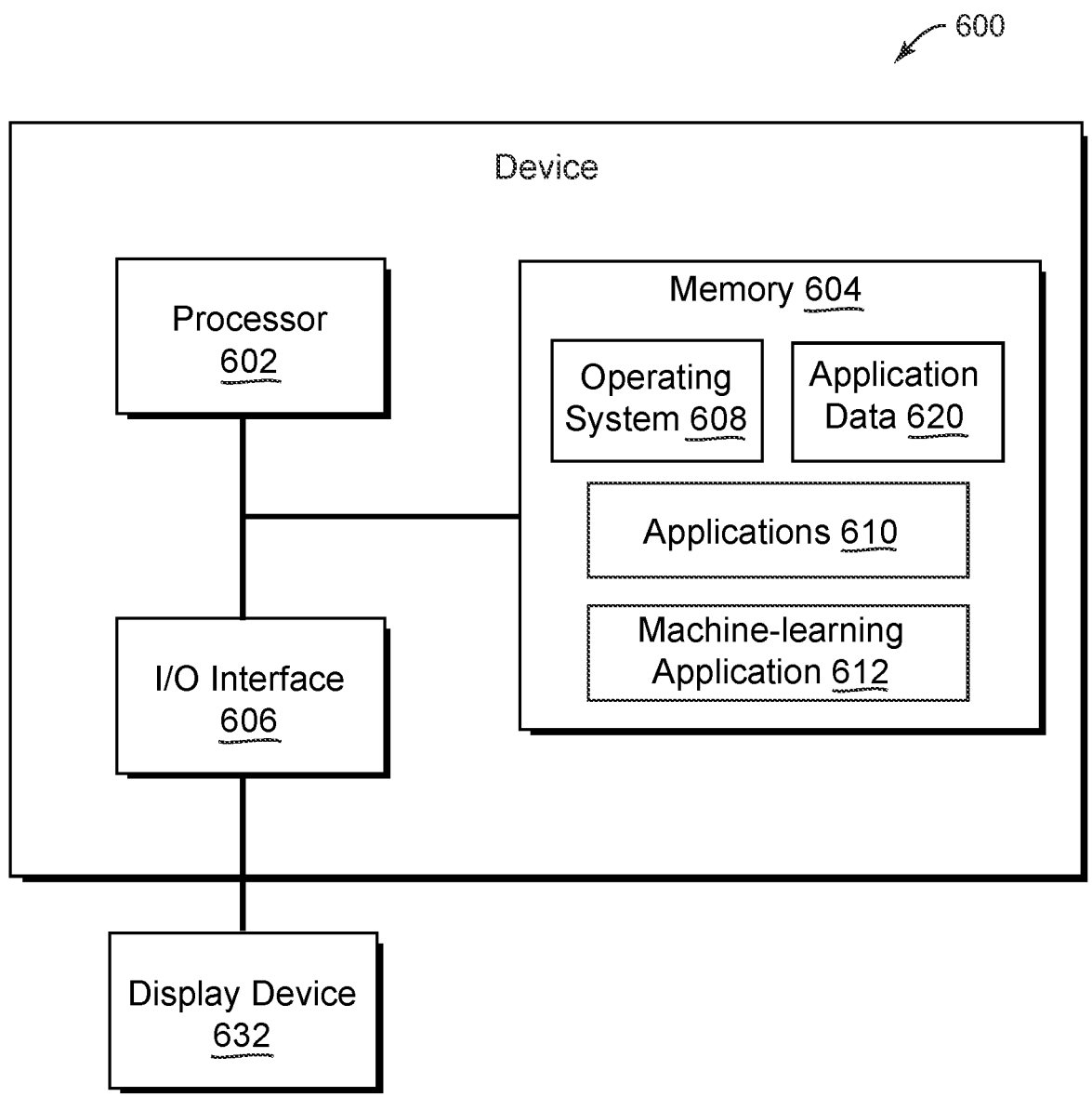
FIG. 6 is a block diagram of an example device which may be used for one or more implementations described herein.

FIG. 6 is a block diagram of an example device 600 which may be used to implement one or more features described herein. In one example, device 600 may be used to implement a computer device, e.g., a server (e.g., server 102 of FIG. 1), and perform appropriate method implementations described herein. In some implementations, device 600 can be a client device to implement and/or be used with features described herein, e.g., any of client devices 120-126 shown in FIG. 1. Device 600 can be any suitable computer system, server, or other electronic or hardware device. For example, the device 600 can be a mainframe computer, desktop computer, workstation, portable computer, portable device, mobile device, cell phone, smart phone, tablet computer, television, TV set top box, personal digital assistant (PDA), media player, game device, wearable device, etc.

In some implementations, device 600 includes a processor 602, a memory 604, and input/output (I/O) interface 606.

Processor 602 can be one or more processors and/or processing circuits to execute program code and control basic operations of the device 600. A "processor" includes any suitable hardware and/or software system, mechanism or component that processes data, signals or other information. A processor may include a system with a general-purpose central processing unit (CPU), multiple processing units, dedicated circuitry for achieving functionality, or other systems. Processing need not be limited to a particular geographic location, or have temporal limitations. For example, a processor may perform its functions in "real-time," "offline," in a "batch mode," etc. Portions of processing may be performed at different times and at different locations, by different (or the same) processing systems. A computer may be any processor in communication with a memory.

Memory 604 is typically provided in device 600 for access by the processor 602, and may be any suitable processor-readable storage medium, e.g., random access memory (RAM), read-only memory (ROM), Electrical Erasable Read-only Memory (EEPROM), Flash memory, etc., suitable for storing instructions for execution by the processor, and located separate from processor 602 and/or integrated therewith. Memory 604 can store software operating on the server device 600 by the processor 602, including an operating system 608, one or more applications 610, and application data 620. In some implementations, applications 610 can include instructions that enable processor 602 to perform the functions described herein, e.g., some or all of the methods of FIG. 3 or 4. Application data 620 can include data used by applications 610.

Any of software in memory 604 can alternatively be stored on any other suitable storage location or computer-readable medium. In addition, memory 604 (and/or other connected storage device(s)) can store drivers, firmware, signal quality indicators, sensor data, user data and preferences, and other instructions and data used in the features described herein. Memory 604 and any other type of storage (magnetic disk, optical disk, magnetic tape, or other tangible media) can be considered "storage" or "storage devices."

I/O interface 606 can provide functions to enable device 600 to interface with other systems and devices. Interfaced devices can be included as part of the device 600 or can be separate and communicate with the device 600. For example, network communication devices, storage devices (e.g., memory and/or database 106), and input/output devices can communicate via I/O interface 606. In some implementations, the I/O interface can connect to interface devices such as input devices (keyboard, pointing device, touchscreen, microphone, camera, scanner, sensors, etc.) and/or output devices (display device, speaker devices, printer, motor, etc.). Some examples of interface devices include one or more cameras which can capture images. Some implementations can provide a microphone for capturing sound (e.g., as a part of captured images, voice commands, etc.), audio speaker devices for outputting sound, or other input and output devices.

Additional examples of interface devices that can connect to I/O interface 606 can include one or more display devices 632 that can be used to display content, e.g., images, video, and/or a user interface of an output application as described herein. Display device 632 can be connected to device 600 via local connections (e.g., display bus) and/or via networked connections and can be any suitable display device. Display device 632 can include any suitable display device such as an LCD, LED, or plasma display screen, CRT, television, monitor, touchscreen, 3-D display screen, projector, or other visual display device. For example, display device 632 can be a flat display screen provided on a mobile device, multiple display screens provided in a goggles device, or a monitor screen for a computer device.

In various examples, applications 610 stored in memory 604 can include a display application that can display video or image data in a graphical user interface of the device, where the user interface is receptive to user input to scroll or otherwise change the displayed content. Other applications can also be included in applications 610, e.g., communication applications, web browser applications, media display applications, web hosting engine or application, social networking engine or application, etc. In some examples, device 600 can be a server and applications 610 include a scenario builder (e.g., scenario builder 210) to select or generate transmission scenarios, and application data 620 includes transmission scenarios and transmission characteristics values. In another example, device 600 is a client device and applications 610 include a responder (e.g., responder 236) that provides reply messages in response to test messages as described herein.

In some implementations, applications 610 can include a machine-learning application 612. In some examples, machine-learning application 612 can include one or more named-entity recognition (NER) implementations for which supervised and/or unsupervised learning can be used. The machine learning models can include multi-task learning based models, residual task bidirectional LSTM (long short-term memory) with conditional random fields, statistical NER, etc. In various implementations, machine-learning application 612 may utilize Bayesian classifiers, support vector machines, neural networks, or other learning techniques. In some implementations, machine-learning application 612 may include a trained model, an inference engine, and data, e.g., training data used to generate the trained model. For example, training data may include any type of data suitable for training a model for determining transmission characteristics for a transmission scenario, etc. Training data may be obtained from any source, e.g., a data repository specifically marked for training, data for which permission is provided for use as training data for machine-learning, etc. In implementations where one or more users permit use of their respective user data to train the trained model, training data may include such user data. In implementations where users permit use of their respective user data, the training data may include permitted data.

In some implementations, training data may include synthetic data generated for the purpose of training, such as data that is not based on user input or activity in the context that is being trained, e.g., data generated from test transmissions of wireless signals. In some implementations, machine-learning application 612 excludes training data. For example, in these implementations, a trained model may be generated, e.g., on a different device, and be provided as part of machine-learning application 612. In various implementations, the trained model may be provided as a data file that includes a model structure or form, and associated weights. The inference engine may read the data file for the trained model and implement a neural network with node connectivity, layers, and weights based on the model structure or form specified in the trained model.

In some implementations, the trained model 612 may include one or more model forms or structures. For example, model forms or structures can include any type of neural-network, such as a linear network, a deep neural network that implements a plurality of layers (e.g., "hidden layers" between an input layer and an output layer, with each layer being a linear network), a convolutional neural network (e.g., a network that splits or partitions input data into multiple parts or tiles, processes each tile separately using one or more neural-network layers, and aggregates the results from the processing of each tile), a sequence-to-sequence neural network (e.g., a network that takes as input sequential data, such as words in a sentence, frames in a video, etc. and produces as output a result sequence), etc. The model form or structure may specify connectivity between various nodes and organization of nodes into layers. An output layer produces an output of the machine-learning application. For example, the output may be a transmission scenario or transmission characteristics, etc. depending on the specific trained model. In some implementations, model form or structure also specifies a number and/or type of nodes in each layer.

In different implementations, the trained model can include a plurality of nodes, arranged into layers per the model structure or form. In some implementations, the nodes may be computational nodes with no memory, e.g., configured to process one unit of input to produce one unit of output. Computation performed by a node may include, for example, multiplying each of a plurality of node inputs by a weight, obtaining a weighted sum, and adjusting the weighted sum with a bias or intercept value to produce the node output. In some implementations, the computation performed by a node may also include applying a step/activation function to the adjusted weighted sum. In some implementations, the step/activation function may be a nonlinear function. In various implementations, such computation may include operations such as matrix multiplication. In some implementations, computations by the plurality of nodes may be performed in parallel, e.g., using multiple processors cores of a multicore processor, using individual processing units of a GPU, or special-purpose neural circuitry. In some implementations, nodes may include memory, e.g., may be able to store and use one or more earlier inputs in processing a subsequent input. For example, nodes with memory may include long short-term memory (LSTM) nodes. LSTM nodes may use the memory to maintain "state" that permits the node to act like a finite state machine (FSM).

In some implementations, the trained model may include embeddings or weights for individual nodes. For example, a model may be initiated as a plurality of nodes organized into layers as specified by the model form or structure. At initialization, a respective weight may be applied to a connection between each pair of nodes that are connected per the model form, e.g., nodes in successive layers of the neural network. For example, the respective weights may be randomly assigned, or initialized to default values. The model may then be trained, e.g., using training data, to produce a result.

For example, training may include applying supervised learning techniques. In supervised learning, the training data can include a plurality of inputs (e.g., a set of signal quality indicators, server and client device status and characteristics, etc.) and a corresponding expected output for each input (e.g., one or more transmission characteristics for a transmission scenario). Based on a comparison of the output of the model with the expected output, values of the weights are automatically adjusted, e.g., in a manner that increases a probability that the model produces the expected output when provided similar input.

In some implementations, training may include applying unsupervised learning techniques. In unsupervised learning, only input data may be provided and the model may be trained to differentiate data, e.g., to cluster input data into a plurality of groups, where each group includes input data that are similar in some manner. For example, the model may be trained to identify transmission characteristics that are associated with higher reliability wireless signals and/or select thresholds for determining or classifying transmission characteristics. In some implementations, unsupervised learning may be used to produce knowledge representations, e.g., that may be used by machine-learning application 612. In various implementations, a trained model includes a set of weights, or embeddings, corresponding to the model structure. In implementations where training data is omitted, machine-learning application 612 may include a trained model that is based on prior training, e.g., by a developer of the machine-learning application 612, by a third-party, etc. In some implementations, the trained model may include a set of weights that are fixed, e.g., downloaded from a server that provides the weights.

Machine-learning application 612 also includes an inference engine, which is configured to apply the trained model to data to provide an inference. In some implementations, the inference engine may include software code to be executed by processor 602. In some implementations, the inference engine may specify circuit configuration (e.g., for a programmable processor, for a field programmable gate array (FPGA), etc.) enabling processor 602 to apply the trained model. In some implementations, the inference engine may include software instructions, hardware instructions, or a combination. In some implementations, the inference engine may offer an application programming interface (API) that can be used by operating system 608 and/or other applications 610 to invoke the inference engine, e.g., to apply the trained model to obtained data to generate an inference.

Machine-learning application 612 may provide several technical advantages. For example, when the trained model is generated based on unsupervised learning, the trained model can be applied by the inference engine to produce knowledge representations (e.g., numeric representations) from input data. For example, a model trained for transmission scenarios may produce transmission characteristics and confidences for a transmission scenario. In some implementations, such representations may be helpful to reduce processing cost (e.g., computational cost, memory usage, etc.) to generate an output (e.g., a transmission scenario for use). In some implementations, such representations may be provided as input to a different machine-learning application that produces output from the output of the inference engine.

In some implementations, machine-learning application 612 may be implemented in an offline manner. In these implementations, the trained model may be generated in a first stage, and provided as part of machine-learning application 612. In some implementations, machine-learning application 612 may be implemented in an online manner. For example, in such implementations, an application that invokes machine-learning application 612 (e.g., operating system 608, one or more of applications 610) may utilize an inference produced by machine-learning application 612, e.g., provide the inference to a user, and may generate system logs (e.g., if permitted by the user, an action taken by the user based on the inference; or if utilized as input for further processing, a result of the further processing). System logs may be produced periodically and may be used, with user permission, to update the trained model, e.g., to update embeddings for the trained model.

In some implementations, machine-learning application 612 may be implemented in a manner that can adapt to particular configuration of device 600 on which the machine-learning application 612 is executed. For example, machine-learning application 612 may determine a computational graph that utilizes available computational resources, e.g., processor 602.

In some implementations, machine-learning application 612 may implement an ensemble of trained models. For example, the trained model may include a plurality of trained models that are each applicable to same input data. In these implementations, machine-learning application 612 may choose a particular trained model, e.g., based on available computational resources, success rate with prior inferences, etc. In some implementations, machine-learning application 612 may execute the inference engine such that a plurality of trained models is applied. In these implementations, machine-learning application 612 may combine outputs from applying individual models, e.g., using a voting-technique that scores individual outputs from applying each trained model, or by choosing one or more particular outputs.

For ease of illustration, FIG. 6 shows one block for each of processor 602, memory 604, I/O interface 606, and software blocks 608, 610, and 620. These blocks may represent one or more processors or processing circuitries, operating systems, memories, I/O interfaces, applications, and/or software modules. In other implementations, device 600 may not have all of the components shown and/or may have other elements including other types of elements instead of, or in addition to, those shown herein. While some components are described as performing blocks and operations as described in some implementations herein, any suitable component or combination of components of network environment 100, device 600, similar systems, or any suitable processor or processors associated with such a system, may perform the blocks and operations described.

Although the description has been described with respect to particular implementations, these particular implementations are merely illustrative, and not restrictive. Concepts illustrated in the examples may be applied to other examples and implementations.

Further to the descriptions above, a user may be provided with controls allowing the user to make an election as to both if and when systems, programs, or features described herein may enable collection of user information (e.g., information about a user's social network, social actions, or activities, profession, a user's preferences, or a user's or user device's current location), and if the user is sent content or communications from a server. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over what information is collected about the user, how that information is used, and what information is provided to the user.

Note that the functional blocks, operations, features, methods, devices, and systems described in the present disclosure may be integrated or divided into different combinations of systems, devices, and functional blocks as would be known to those skilled in the art. Any suitable programming language and programming techniques may be used to implement the routines of particular implementations. Different programming techniques may be employed such as procedural or object-oriented. The routines may execute on a single processing device or multiple processors. Although the steps, operations, or computations may be presented in a specific order, the order may be changed in different particular implementations. In some implementations, multiple steps or operations shown as sequential in this specification may be performed at the same time.

What is claimed is:

1. A computer-implemented method comprising:
  determining a first transmission scenario associated with transmission of wireless signals of a particular wireless communication protocol from a first device to a second device, the first transmission scenario specifying one or more first transmission characteristics for the transmission of the wireless signals, wherein at least one of the one or more first transmission characteristics is based on a status of the first device, the status of the first device including at least one of:
    a peripheral being connected to the first device via a physical connector,
    use of one or more antennas of the first device by a second wireless communication protocol that is different than the particular wireless communication protocol, or
    a spatial status of the first device, wherein the spatial status includes at least one of: a motion or an orientation of the first device in space;

sending a first test message wirelessly from the first device to the second device based on the one or more first transmission characteristics of the first transmission scenario;

receiving a first reply message from the second device in response to the first test message, the first reply message including one or more first signal quality indicators that indicate a signal quality of the first test message;

selecting the first transmission scenario as a designated scenario based on the one or more first signal quality indicators; and causing data to be wirelessly transmitted via the wireless signals from the first device to the second device based on the one or more first transmission characteristics of the designated scenario.

2. The method of claim 1, wherein selecting the first transmission scenario as the designated scenario includes determining that the one or more first signal quality indicators each meet or exceed a corresponding threshold.

3. The method of claim 1, further comprising detecting a threshold change in position or motion of at least one of the first device or the second device, wherein the threshold change is at least one of: movement of a threshold distance, rotation or tilt of a threshold angle, or movement of a threshold velocity, and wherein determining the first transmission scenario is in response to detecting the threshold change.

4. The method of claim 1, further comprising detecting a change in status of a wireless connection between the first device and the second device, wherein the change in status includes a reduction in signal quality for the wireless signals received by the second device, and wherein determining the first transmission scenario is in response to detecting the change in status of the wireless connection.

5. The method of claim 1, wherein determining the first transmission scenario includes determining the at least one first transmission characteristic of the first transmission scenario based on the status of the first device.

6. The method of claim 1, further comprising:
determining a second transmission scenario that specifies one or more second transmission characteristics of which at least one transmission characteristic has a different value from a corresponding at least one transmission characteristic of the first transmission scenario;
sending a second test message from the first device to the second device according to based on the one or more second transmission characteristics of the second transmission scenario; and
receiving a second reply message from the second device in response to sending the second test message, the second reply message including one or more second signal quality indicators,
wherein selecting the first transmission scenario as the designated scenario includes comparing the first signal quality indicators to the second signal quality indicators.

7. The method of claim 6, wherein determining the first transmission scenario is subsequent to determining the second transmission scenario and is in response to at least one of the one or more second signal quality indicators being below a corresponding threshold.

8. The method of claim 1, further comprising:
determining a set of transmission scenarios associated with transmission of the wireless signals of the particular wireless communication protocol from the first device to the second device, each of the transmission scenarios in the set specifying at least one different transmission characteristic than the other transmission scenarios in the set,
wherein determining the first transmission scenario includes selecting the first transmission scenario from the set of transmission scenarios.

9. The method of claim 8, wherein the first transmission scenario is from a first set of transmission scenarios, and further comprising:
determining a second set of transmission scenarios associated with transmission of the wireless signals of the particular wireless communication protocol from the first device to a third device, each of the second set of transmission scenarios specifying at least one different transmission characteristic than the other transmission scenarios in the second set;
selecting a third transmission scenario from the second set of transmission scenarios;
sending a third test message from the first device to the third device according to the third transmission scenario;
receiving a third reply message from the third device in response to sending the third test message, the third reply message including one or more third signal quality indicators;
selecting the third transmission scenario as a second designated scenario based on the one or more third signal quality indicators; and
causing second data to be wirelessly transmitted from the first device to the third device according to the second designated scenario.

10. The method of claim 1, wherein the one or more first transmission characteristics include a particular antenna of a plurality of antennas of the first device via which the wireless signals are to be transmitted from the first device to the second device, wherein sending the first test message includes sending the first test message using the particular antenna, and wherein causing the data to be wirelessly transmitted via the wireless signals from the first device to the second device based on the one or more first transmission characteristics of the designated scenario includes selecting the particular antenna to transmit the data in the wireless signals from the first device to the second device.

11. The method of claim 1, wherein the one or more first transmission characteristics include a value of a tuning parameter for an antenna of the first device that transmits the wireless signals from the first device to the second device, wherein sending the first test message includes sending the first test message using the value of the tuning parameter, and wherein causing the data to be wirelessly transmitted via the wireless signals from the first device to the second device based on the one or more first transmission characteristics of the designated scenario includes selecting the value of the tuning parameter for the wireless signals.

12. The method of claim 1, wherein the one or more first transmission characteristics include a magnitude of a bit rate of data transmission, wherein sending the first test message includes sending the first test message using the magnitude of the bit rate of data transmission, and wherein causing the data to be wirelessly transmitted via the wireless signals from the first device to the second device based on the one or more first transmission characteristics of the designated scenario includes selecting the magnitude of the bit rate for the data wirelessly transmitted.

13. The method of claim 1, wherein the one or more first transmission characteristics include a particular hardware circuit path over which the wireless signals are to be transmitted from the first device to the second device from a plurality of hardware circuit paths of the first device, wherein sending the first test message includes sending the first test message using the particular hardware circuit path, and wherein causing the data to be wirelessly transmitted via the wireless signals from the first device to the second device based on the one or more first transmission characteristics of the designated scenario includes selecting the particular hardware circuit path for the wireless signals.

14. The method of claim 1, wherein the one or more first transmission characteristics include a magnitude of a power level of the wireless signals to be transmitted from the first device to the second device, wherein sending the first test message includes sending the first test message using the magnitude of the power level, and wherein causing the data to be wirelessly transmitted via the wireless signals from the first device to the second device according to based on the one or more first transmission characteristics of the designated scenario includes selecting the magnitude of the power level for the wireless signals.

15. The method of claim 1, wherein the one or more first signal quality indicators include at least one of:
  a received signal strength indicator (RSSI) that indicates a power level or signal to noise ratio of the first test message received at the second device; or
  a link quality indicator (LQI) that indicates data throughput rate of the first test message.

16. The method of claim 1, wherein the particular wireless communication protocol is a Bluetooth wireless communication protocol standard.

17. A device comprising:
  one or more antennas;
  a memory storing instructions;
  at least one processor coupled to the one or more antennas and to the memory, the at least one processor configured to access the instructions from the memory and perform operations comprising:
    determining a first transmission scenario associated with transmission of wireless signals of a particular wireless communication protocol from a first device to a second device, the first transmission scenario specifying a first plurality of transmission characteristics for the transmission of the wireless signals, wherein at least one of the first plurality of transmission characteristics is based on a status of the first device, the status of the first device including at least one of:
      a peripheral being connected to the first device via a physical connector,
      use of one or more antennas of the first device by a second wireless communication protocol that is different than the particular wireless communication protocol, or
      a spatial status of the first device, wherein the spatial status includes at least one of: a motion or an orientation of the first device in space;
    sending a first test message wirelessly from the first device to the second device based on the first plurality of transmission characteristics of the first transmission scenario using at least one of the one or more antennas;
    receiving a first reply message from the second device in response to the first test message, the first reply message including one or more first signal quality indicators that indicate a signal quality of the first test message;
    determining a second transmission scenario that specifies a second plurality of transmission characteristics for the transmission of the wireless signals, wherein at least one transmission characteristic is different than a corresponding at least one transmission characteristic of the first transmission scenario;
    sending a second test message wirelessly from the first device to the second device based on the second plurality of transmission characteristics of the second transmission scenario using one or more of the one or more antennas;
    receiving a second reply message from the second device in response to the second test message, the second reply message including one or more second signal quality indicators that indicate a signal quality of the second test message;
    selecting one of the first and the second transmission scenarios as a designated scenario based on the one or more first signal quality indicators and the one or more second signal quality indicators; and
    causing data to be wirelessly transmitted via the wireless signals from the first device to the second device based on the first or second plurality of transmission characteristics specified by the designated scenario.

18. The device of claim 17, wherein the operation of determining the second transmission scenario is in response to each of the one or more first signal quality indicators being below a corresponding threshold, and
  wherein the operation of selecting one of the first and the second transmission scenarios as the designated scenario includes selecting the second transmission scenario as the designated scenario.

19. The device of claim 17, wherein the first plurality of transmission characteristics and the second plurality of transmission characteristics include at least one of:
  a particular antenna of a plurality of antennas of the first device via which the wireless signals are to be transmitted from the first device to the second device,
  a tuning parameter for the particular antenna,
  a bit rate of data provided by the wireless signals,
  a particular hardware circuit path of a plurality of hardware circuit paths of the first device over which the wireless signals are to be transmitted prior to being transmitted wirelessly from the first device to the second device, or
  a power level of the wireless signals.

20. A non-transitory computer readable medium having stored thereon software instructions that, when executed by a processor, cause the processor to perform operations comprising:
  determining a set of transmission scenarios associated with transmission of wireless signals of a particular wireless communication protocol from a first device to a second device, each of the transmission scenarios in the set specifying one or more transmission characteristics that include at least one different transmission characteristic than the other transmission scenarios in the set;
  selecting a first transmission scenario of the set of transmission scenarios, the first transmission scenario specifying one or more first transmission characteristics, wherein at least one of the one or more first transmission characteristics is based on a status of the first device, the status of the first device including at least one of:
    a peripheral being connected to the first device via a physical connector, or use of one or more antennas of the first device by a second wireless communication protocol that is different than the particular wireless communication protocol;

sending a first test message wirelessly from the first device to the second device based on the one or more first transmission characteristics of the first transmission scenario;

receiving a first reply message from the second device in response to the first test message, the first reply message including one or more first signal quality indicators that indicate a signal quality of the first test message;

selecting the first transmission scenario as a designated transmission scenario based on the one or more first signal quality indicators; and causing data to be wirelessly transmitted via the wireless signals from the first device to the second device based on the one or more first transmission characteristics of the designated transmission scenario.

* * * * *

UNITED STATES PATENT AND TRADEMARK OFFICE
CERTIFICATE OF CORRECTION

PATENT NO. : 11,659,584 B2
APPLICATION NO. : 17/316443
DATED : May 23, 2023
INVENTOR(S) : Yang et al.

It is certified that error appears in the above-identified patent and that said Letters Patent is hereby corrected as shown below:

In the Claims

In Column 33, Line 47, please delete "device according to based" and insert -- device based -- therefor.

In Column 35, Line 17, please delete "device according to based" and insert -- device based -- therefor.

Signed and Sealed this
Eighteenth Day of July, 2023

Katherine Kelly Vidal
*Director of the United States Patent and Trademark Office*